US011281456B2

United States Patent
Taniguchi

(10) Patent No.: US 11,281,456 B2
(45) Date of Patent: Mar. 22, 2022

(54) APPLICATION DEVELOPMENT ENVIRONMENT PROVIDING SYSTEM, APPLICATION DEVELOPMENT ENVIRONMENT PROVISION METHOD, TERMINAL DEVICE, AND APPLICATION DISPLAY METHOD

(71) Applicant: Yokogawa Electric Corporation, Tokyo (JP)

(72) Inventor: Koichi Taniguchi, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 21 days.

(21) Appl. No.: 16/337,079

(22) PCT Filed: Sep. 1, 2017

(86) PCT No.: PCT/JP2017/031585
§ 371 (c)(1),
(2) Date: Mar. 27, 2019

(87) PCT Pub. No.: WO2018/061614
PCT Pub. Date: Apr. 5, 2018

(65) Prior Publication Data
US 2020/0057631 A1 Feb. 20, 2020

(30) Foreign Application Priority Data
Sep. 30, 2016 (JP) .............................. JP2016-193454

(51) Int. Cl.
*G06F 8/70* (2018.01)
*G06F 8/33* (2018.01)
*G06K 9/62* (2006.01)

(52) U.S. Cl.
CPC ................. *G06F 8/70* (2013.01); *G06F 8/33* (2013.01); *G06K 9/6267* (2013.01)

(58) Field of Classification Search
CPC ............ G06F 8/70; G06F 8/33; G06K 9/6267
(Continued)

(56) References Cited

U.S. PATENT DOCUMENTS

2010/0306748 A1* 12/2010 Erdmann ................. G06F 8/45
717/140
2014/0289391 A1 9/2014 Balaji et al.
(Continued)

FOREIGN PATENT DOCUMENTS

JP 2010-528361 A 8/2010
JP 2012-523038 A 9/2012
(Continued)

OTHER PUBLICATIONS

Peter Mell et al., "The NIST Definition of Cloud Computing", NIST, Special Publication 800-145, Sep. 2011, 15 pages, https://www.ipa.go.jp/files/000025366.pdf.
(Continued)

*Primary Examiner* — Lewis A Bullock, Jr.
*Assistant Examiner* — Theodore E Hebert
(74) *Attorney, Agent, or Firm* — Sughrue Mion, PLLC

(57) ABSTRACT

An application development environment providing system which provides a development environment for an application program via a network, wherein the network includes a first network which accommodates at least one device and which is communicatively connected to the device, and a second network communicatively connected to the first network, and wherein the application development environment providing system includes a program developer configured to classify processes included in the application program into a process executed in the first network and a process executed in the second network based on a predetermined determination condition, and to generate a first program execution file executed in the first network and a
(Continued)

second program execution file executed in the second network in cooperation with the first program execution file.

22 Claims, 14 Drawing Sheets

(58) Field of Classification Search
USPC .......................................................... 717/106
See application file for complete search history.

(56) References Cited

U.S. PATENT DOCUMENTS

| | | | |
|---|---|---|---|
| 2015/0051930 A1* | 2/2015 | Yamaguchi | ........ G06Q 10/0631 |
| | | | 705/7.12 |
| 2015/0215394 A1* | 7/2015 | Nemoto | .................. G06F 9/505 |
| | | | 709/202 |
| 2016/0224337 A1 | 8/2016 | Xia et al. | |

FOREIGN PATENT DOCUMENTS

| | | |
|---|---|---|
| JP | 2014-035717 A | 2/2014 |
| JP | 5792891 B2 | 10/2015 |
| WO | 2010/120440 A2 | 10/2010 |

OTHER PUBLICATIONS

Yohei Iwasaki et al., "Fine Grain Automatic Distribution Method for Software that Realizes Distributed and Coordinated-Type Linking", Ninth Workshop Pertaining to Programming and Applied Systems SPA2006, Japan Society for Software Science and Technology, Software System Research Society, Mar. 5, 2006, pp. 1-6.

International Search Report for PCT/JP2017/031585, dated Nov. 28, 2017.

* cited by examiner

| REFRIGERATOR | PERFORMANCE COEFFICIENT |
|---|---|
| 1 | 0.32 |
| 2 | 0.24 |
| 3 | 0.28 |
| 4 | 0.11 |
| 5 | 0.08 |
| 6 | 0.09 |

APPLICATION DEVELOPMENT ENVIRONMENT PROVIDING SYSTEM, APPLICATION DEVELOPMENT ENVIRONMENT PROVISION METHOD, TERMINAL DEVICE, AND APPLICATION DISPLAY METHOD

CROSS REFERENCE TO RELATED APPLICATIONS

This Application is a National Stage of International Application No. PCT/JP2017/031585 filed Sep. 1, 2017, claiming priority based on Japanese Patent Application No. 2016-193454 filed Sep. 30, 2016.

TECHNICAL FIELD

The present invention relates to an application development environment providing system, an application development environment provision method, a terminal device, and an application display method.

BACKGROUND ART

In a plant, a factory, or the like, a distributed control system (DCS) in which field devices (measurement devices and operating devices) and a control device that controls the field devices are connected via communication means is constructed, and advanced automatic operation is realized. In a plant in which such an advanced automatic operation is realized, various systems (engineering systems) such as a manufacturing execution system (MES), a plant information management system (PIMS), and an enterprise resource planning (ERP) system are often constructed, in addition to the distributed control system.

Most of these engineering systems are realized by using devices installed in a plant such as a programmable logic controller (PLC), a factory automation (FA) computer, a general-purpose desktop computer, or a server device. In recent years, with the progress of communication technology, some of the engineering systems are realized by cloud computing via a network.

Here, the cloud computing may conform to a definition described in a document specified by the following URL (Uniform Resource Locator) (a definition recommended by the US National Institute of Standards and Technology).

http://nvlpubs.nist.gov/nistpubs/Legacy/SP/nistspecialpublication800-145.pdf https://www.ipa.go.jp/files/000025366.pdf Patent literature 1 below discloses cloud computing for an industrial automation and production system. Patent literature 2 below discloses an example of a technology for providing, through cloud computing, a development environment for developing an application program to be used in a cloud computing environment.

CITATION LIST

Patent Literature

[Patent Literature 1] Japanese Unexamined Patent Application Publication (Translation of PCT Application) No. 2012-523038

[Patent Literature 2] Japanese Patent No. 5792891

SUMMARY OF INVENTION

Technical Problem

For example, in industrial automation and production systems, like a process involving feedback such as HD control (Proportional-Integral-Differential Controller), a process that is required to be immediately executed in response to an input of data measured by a sensor or the like may be included. In a case where such a process is executed by the cloud computing disclosed in the patent literature 1 or the like, there is a case that a process such as control is not performed normally due to occurrence of delay (delay of data arrival time) and fluctuation (fluctuation of arrival time of plural data communication) in data communication.

The system that provides the development environment disclosed in, for example, patent literature 2 described above is used at various enterprises (tenants). For example, in a case in which development of an engineering system that is realized at a plant is performed, the system that provides the development environment is used by a customer (for example, an orderer), an engineering company (for example, a contractor), and a third vendor (a third party).

In such a system used by various tenants, from a viewpoint of security, an existence of a device used in a plant must not be known to other tenants. Even in the same tenant, it may wish to limit accesses from other departments (sites) or other employees (users). In such a system used by various tenants, from a viewpoint of safety, there are cases where it is necessary to prevent devices used in a plant from being used not for a specific purpose.

As described above, in the case where it is necessary to take into consideration requirements such as promptness of an execution process, security, safety, and so on according to individual process contents included in the application program, it is necessary to classify the process contents based on the requirements, and generate an application program in which a program execution file is divided for each of the classified process contents. In order to generate such an application program, it is necessary to individually design and create a plurality of the application programs, and compile each of the application programs individually to generate respective program execution files.

Solution to Problem (1) An aspect of the present invention is an application development environment providing system which provides a development environment for an application program via a network, wherein the network includes a first network which accommodates at least one device and which is communicatively connected to the device, and a second network communicatively connected to the first network, and wherein the application development environment providing system includes a program developer configured to classify processes included in the application program into a process executed in the first network and a process executed in the second network based on a predetermined determination condition, and to generate a first program execution file executed in the first network and a second program execution file executed in the second network in cooperation with the first program execution file.

(2) An aspect of the present invention is the application development environment providing system according to (1), wherein if a control cycle of the device controlled by the application program is equal to or less than a predetermined length, the program developer classifies the process into the process executed in the first network, and wherein if the control cycle of the device controlled by the application program is longer than the predetermined length, the program developer classifies the process into the process executed in the second network.

(3) An aspect of the present invention is the application development environment providing system according to (1), wherein the program developer classifies the processes into the process executed in the first network and the process executed in the second network based on position information representing a position of the device controlled by the application program.

(4) An aspect of the present invention is the application development environment providing system according to (1), wherein the program developer classifies the processes into the process executed in the first network and the process executed in the second network based on information representing that each of the processes is to be executed in the first network or the second network.

(5) An aspect of the present invention is the application development environment providing system according to (1), wherein if it is determined that it is necessary to execute the process with reference to communication contents transmitted from the device controlled by the application program to the first network, the program developer classifies the process into the process executed in the first network, and wherein if it is determined that it is not necessary to execute the process with reference to communication contents transmitted from the device to the first network, the program developer classifies the process into the process executed in the second network.

(6) An aspect of the present invention is the application development environment providing system according to any one of (1) to (5), wherein the program developer generates the first program execution file in which first output destination process identification information and first input source process identification information are specified, the first output destination process identification information is for identifying a data input process executed in the second network to which data output by a data output process executed in the first network is input, and the first input source process identification information is for identifying a data output process executed in the second network to which data input by a data input process executed in the first network is output, and wherein the program developer generates the second program execution file in which second output destination process identification information and second input source process identification information are specified, the second output destination process identification information is for identifying a data input process executed in the first network to which data output by a data output process executed in the second network is input, and the second input source process identification information is for identifying a data output process executed in the first network to which data input by a data input process executed in the second network is output.

(7) An aspect of the present invention is the application development environment providing system according to any one of (1) to (6), wherein if the first network accommodates at least two or more devices, the program developer generates the first program execution file for causing the at least two or more devices to perform a distributed process in accordance with a load condition of the at least two or more devices.

(8) An aspect of the present invention is the application development environment providing system according to any one of (1) to (7), wherein the first network is a spinal node which functions as a gateway, and wherein the second network is a socialization node which provides a cloud computing environment.

(9) An aspect of the present invention is an application development environment provision method performed by a computer which provides a development environment for an application program via a network, wherein the network includes a first network which accommodates at least one device and which is communicatively connected to the device, and a second network communicatively connected to the first network, and wherein the application development environment provision method includes classifying, by a program developer, processes included in the application program into a process executed in the first network and a process executed in the second network based on a predetermined determination condition, and generating, by the program developer, a first program execution file executed in the first network and a second program execution file executed in the second network in cooperation with the first program execution file.

(10) An aspect of the present invention is a non-transitory computer readable storage medium storing one or more programs configured for execution by a computer, the one or more programs including instructions for providing a development environment for an application program via a network which includes a first network which accommodates at least one device and which is communicatively connected to the device and a second network communicatively connected to the first network, classifying processes included in the application program into a process executed in the first network and a process executed in the second network based on a predetermined determination condition, and generating a first program execution file executed in the first network and a second program execution file executed in the second network in cooperation with the first program execution file.

(11) An aspect of the present invention is an information processing device in an application development environment providing system which provides a development environment for an application program via a network, wherein the network includes a first network which accommodates at least one device and which is communicatively connected to the device, and a second network communicatively connected to the first network, and wherein the information processing device configured to, among processes included in the application program classified into a process executed in the first network and a process executed in the second network based on a predetermined determination condition, execute a first program execution file for executing the process executed in the first network in cooperation with a second program execution file for executing the process executed in the second network.

(12) An aspect of the present invention is the information processing device according to (11), wherein if a control cycle of the device controlled by the application program is equal to or less than a predetermined length, the information processing device executes the first program execution file which has been classified into the process executed in the first network and generated.

(13) An aspect of the present invention is the information processing device according to (11), wherein the information processing device executes the first program execution file which has been classified into the process executed in the first network and generated, based on position information representing a position of the device controlled by the application program.

(14) An aspect of the present invention is the information processing device according to (11), wherein the information processing device executes the first program execution file which has been classified into the process executed in the first network and generated, based on information representing that each of the processes is to be executed in the first network or the second network.

(15) An aspect of the present invention is the information processing device according to (11), wherein if it is determined that it is necessary to execute the process with reference to communication contents transmitted from the device controlled by the application program to the first network, the process is classified into the process executed in the first network, wherein if it is determined that it is not necessary to execute the process with reference to communication contents transmitted from the device to the first network, the process is classified into the process executed in the second network, and wherein the information processing device executes the first program execution file which has been classified into the process executed in the first network and generated.

(16) An aspect of the present invention is the information processing device according to any one of (11) to (15), wherein the information processing device executes the first program execution file in which output destination process identification information and input source process identification information are specified, the output destination process identification information is for identifying a data input process executed in the second network to which data output by a data output process executed in the first network is input, and the input source process identification information is for identifying a data output process executed in the second network to which data input by a data input process executed in the first network is output.

(17) An aspect of the present invention is the information processing device according to any one of (11) to (16), wherein if the first network accommodates at least two or more devices, the information processing device executes the first program execution file for causing the at least two or more devices to perform a distributed process in accordance with a load condition of the at least two or more devices.

(18) An aspect of the present invention is the information processing device according to any one of (11) to (17), wherein the first network is a spinal node which functions as a gateway, and wherein the second network is a socialization node which provides a cloud computing environment.

(19) An aspect of the present invention is an application development environment provision method performed by a computer which provides a development environment for an application program via a network, wherein the network includes a first network which accommodates at least one device and which is communicatively connected to the device, and a second network communicatively connected to the first network, and wherein the application development environment provision method includes among processes included in the application program classified into a process executed in the first network and a process executed in the second network based on a predetermined determination condition, executing a first program execution file for executing the process executed in the first network in cooperation with a second program execution file for executing the process executed in the second network.

(20) An aspect of the present invention is a non-transitory computer readable storage medium storing one or more programs configured for execution by a computer, the one or more programs including instructions for providing a development environment for an application program via a network which includes a first network which accommodates at least one device and which is communicatively connected to the device and a second network communicatively connected to the first network, and among processes included in the application program classified into a process executed in the first network and a process executed in the second network based on a predetermined determination condition, executing a first program execution file for executing the process executed in the first network in cooperation with a second program execution file for executing the process executed in the second network.

Further features and aspects of the present disclosure will become apparent from the following detailed description of exemplary embodiments with reference to the attached drawings.

Advantageous Effects of Invention

According to the present invention, it is possible to realize efficient development of application programs in which a program execution file is divided into a plurality of files.

DESCRIPTION OF EMBODIMENTS

Embodiments of the present invention will be described with reference to preferred embodiments. Those skilled in the art can achieve many alternatives to the embodiment using teachings of the present invention, and the present invention is not limited to the preferred embodiments described herein.

One aspect of the present invention is to provide an application development environment providing system, an application development environment provision method, an information processing device, and a computer-readable non-transient recording medium, which are capable of realizing efficient development of application programs in which a program execution file used in a cloud computing environment is divided into a plurality of files.

EMBODIMENTS

The present invention relates to a system (hereinafter referred to as an application development environment providing system) that performs a calculation process or the like using data transmitted from sensors, devices, systems, or the like connected to a communication network as input values in a cloud computing environment. This system is an architecture for providing a development environment for developing programs such as basic software, applications, and solutions of the Internet of Things (IoT) or Industrial Internet of Things (IIoT), and a system for realizing the architecture.

Hereinafter, basic software, applications, solutions, and the like are collectively referred to as applications. Further, programs such as basic software, applications, and solutions are collectively referred to as application programs.

In the following description, the application development environment is a development environment for developing programs such as the basic software, applications, and solutions of the IoT or IIoT, which perform a computation process or the like using data transmitted from sensors, devices, systems, and the like connected to the communication network as input values in the cloud computing environment.

In the following description, the application execution environment is an environment for executing programs such as the basic software, applications, and solutions of the IoT or IIoT, which perform a computation process or the like using data transmitted from sensors, devices, systems, and the like connected to the communication network as input values in the cloud computing environment.

(Overall Flow of Application Development)

An overall flow of application development using the application development environment providing system in order to make it easier to understand description of a functional configuration and operation of the application development environment providing system according to the embodiment to be described below will be described through a specific embodiment.

FIGS. 1 to 7 are schematic diagrams illustrating an example of application development in the application development environment providing system according to the embodiment.

Figure 1:
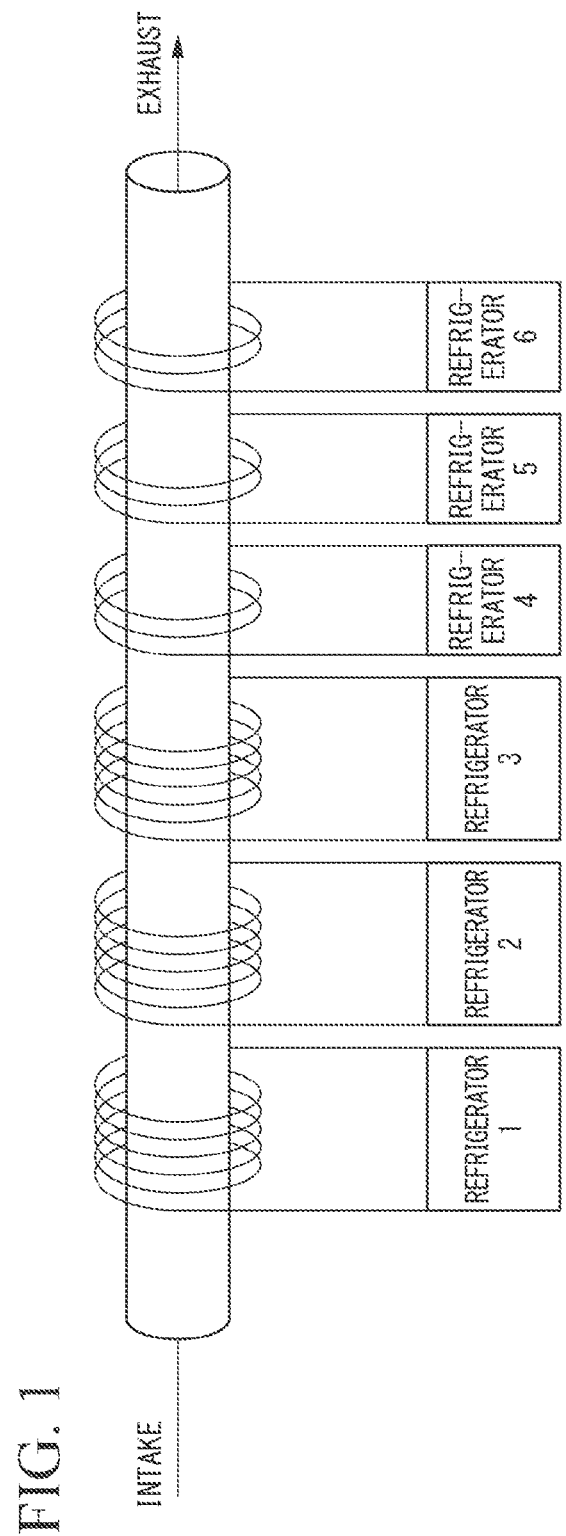
FIG. 1 is a schematic diagram illustrating an example of application development in an application development environment providing system according to an embodiment.

A case in which driving of six refrigerators having different capabilities is controlled in order to adjust a temperature of a gas that is exhausted from a pipe as illustrated in FIG. 1 will be described in the embodiment to be described below. A purpose is to minimize power consumption (output 2) by appropriately switching ON/OFF (inputs 7 to 8) of respective switches of the six refrigerators according to a variation in an intake gas temperature (input 1) in order to maintain an exhaust gas temperature (output 1) in the pipe to be below a certain level.

In the related art, switches of respective refrigerators are switched between ON and OFF according to the intuition and experience of an operator. However, in the application development environment providing system according to the embodiment, an efficient driving control pattern of the refrigerators is discovered, and an application in which an algorithm for automation of the driving control pattern is incorporated has been developed.

A developer who develops an application using the application development environment providing system first disposes development parts indicating an analysis element for multi-input two-output control on the design screen of the application that is displayed on the display of the application development environment providing system. The analysis element is a development part described as "Nx2" in FIG. 2.

Figure 2:
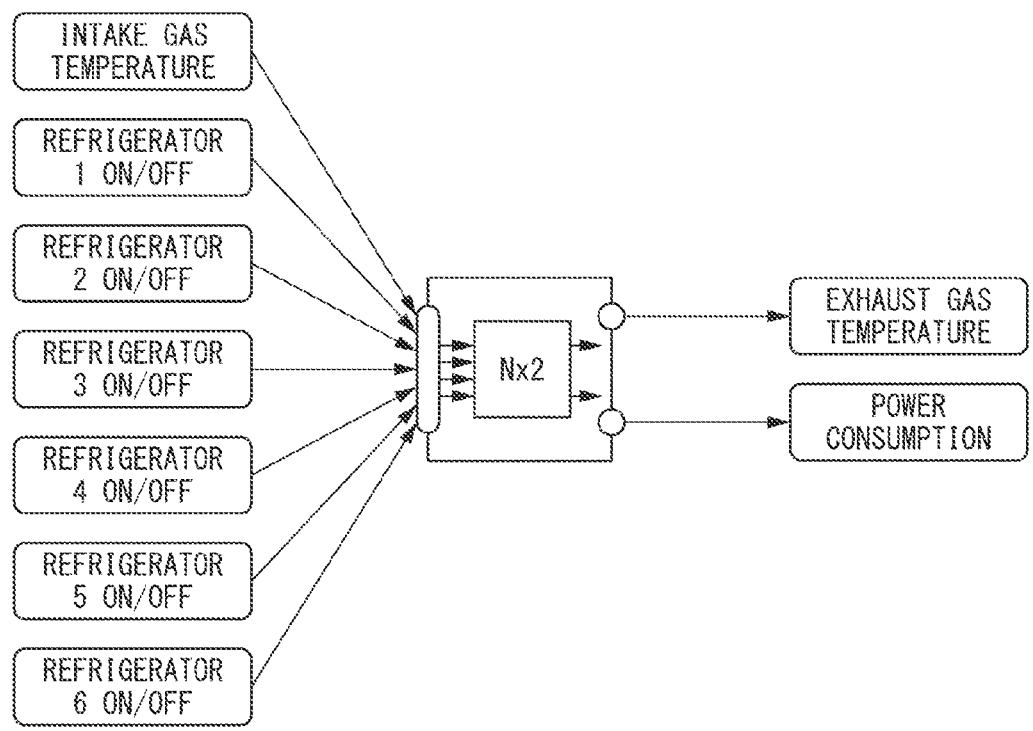
FIG. 2 is a schematic diagram illustrating an example of application development by the application development environment providing system according to the embodiment.

Next, the developer opens a historian (a database in which historical information or achievement information has been stored) and disposes development parts indicating seven input data items including "intake gas temperature", "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF" on a design screen. Thereafter, as illustrated in FIG. 2, the developer connects the development parts indicating the seven input data items to an analysis element "Nx2".

Next, the developer disposes development parts showing two output data items of "exhaust gas temperature" and "power consumption" on the design screen from the historian. Thereafter, as illustrated in FIG. 2, the developer connects the development parts indicating the two output data items to the respective analysis elements of "Nx2". In this case, the developer designates past data for two years as past data of "exhaust gas temperature" and "power consumption" that are used for analysis.

Figure 3A:
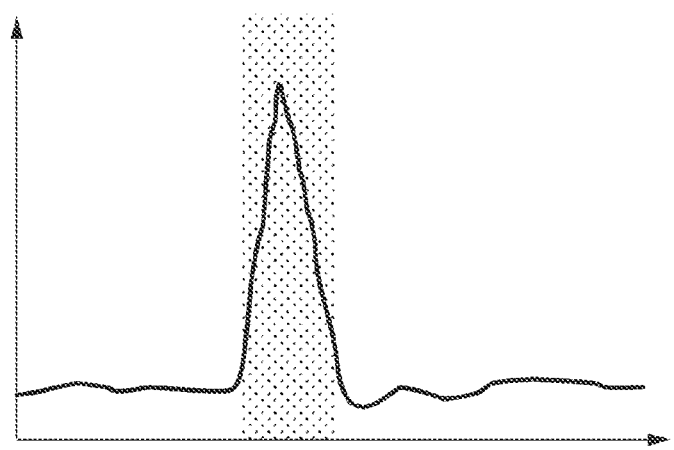
FIG. 3A is a schematic diagram illustrating an example of application development by the application development environment providing system according to the embodiment.
Figure 3B:
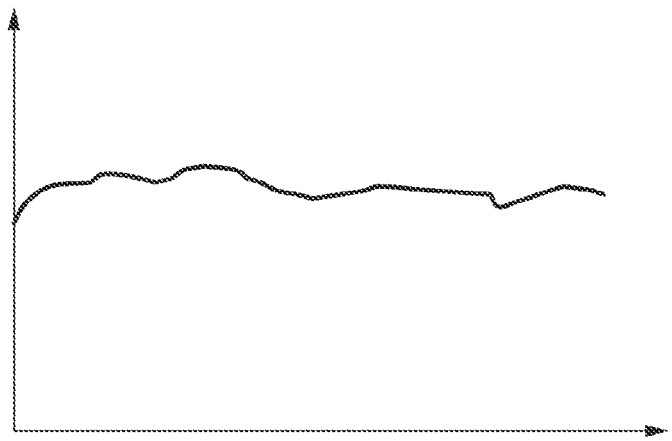
FIG. 3B is a schematic diagram illustrating an example of application development by the application development environment providing system according to the embodiment.

When the developer displays a detailed screen of the analysis element of "Nx2" on the design screen, a line graph as illustrated in FIGS. 3A and 3B, for example, is displayed. In the line graph illustrated in FIG. 3A, a vertical axis represents the exhaust gas temperature and a horizontal axis represents a past time axis. In the line graph illustrated in FIG. 3B, a vertical axis represents power consumption and a horizontal axis represents a past time axis.

In the graph illustrated in FIG. 3A, the presence of a time period in which the exhaust gas temperature has temporarily increased (has been an abnormal value) is shown, and a place corresponding to the time period is displayed in a band shape. The developer inquires about a customer (for example, an enterprise that controls the exhaust gas temperature in the pipe, which is an enterprise that has requested the developer to develop an application). The application development environment providing system includes a chat function, an e-mail transmission and reception function, a call function, and the like as means of communicating with the customer. The developer first inquiries about the customer through the call function.

Through a call with the customer, the developer ascertains that facility renovation work has been performed in a time period in which the exhaust gas temperature has temporarily become high (has been abnormal value), and receives an instruction to exclude data in the time period from analysis targets from the customer. Using the chat function of the application development environment providing system, the developer acquires data indicating a precise time period that is excluded from analysis targets from the customer. The developer causes a screen for setting the analysis exclusion range to be displayed on the design screen, inputs the data indicating the precise time period that is excluded from analysis targets, and sets an analysis exclusion range. The developer inputs a comment acquired from the customer using the chat function, and attaches the comment to a place (a screen region) on which the setting has been performed in the screen on which an analysis exclusion range setting is performed.

Figure 4:
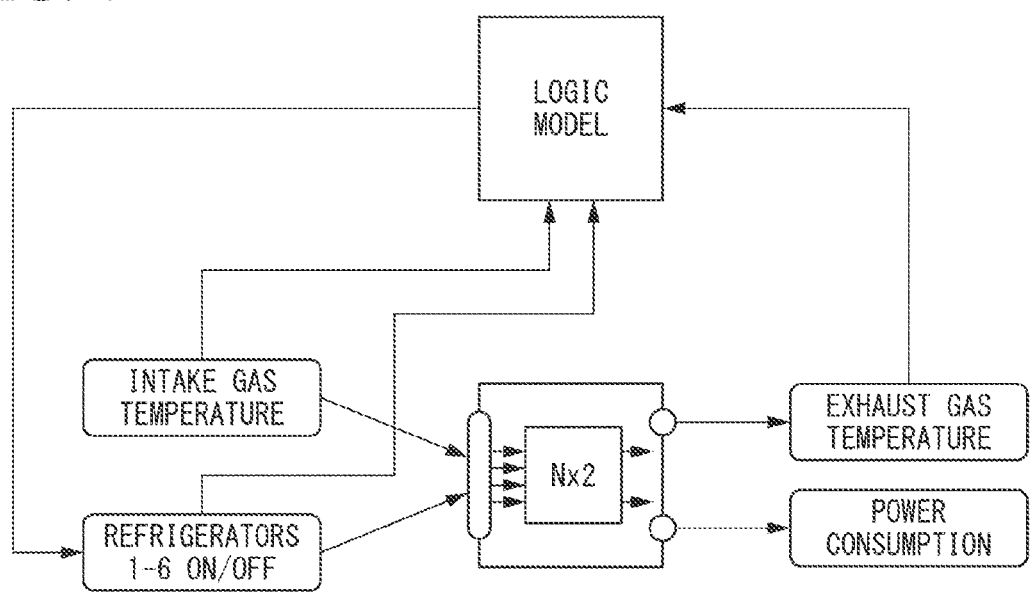
FIG. 4 is a schematic diagram illustrating an example of application development by the application development environment providing system according to the embodiment.

Next, on the design screen, the developer groups six input data items "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF" into one and performs switching to a data input item "refrigerator 1-6 ON/OFF" as illustrated in FIG. 4.

Figures 5A, 5B:
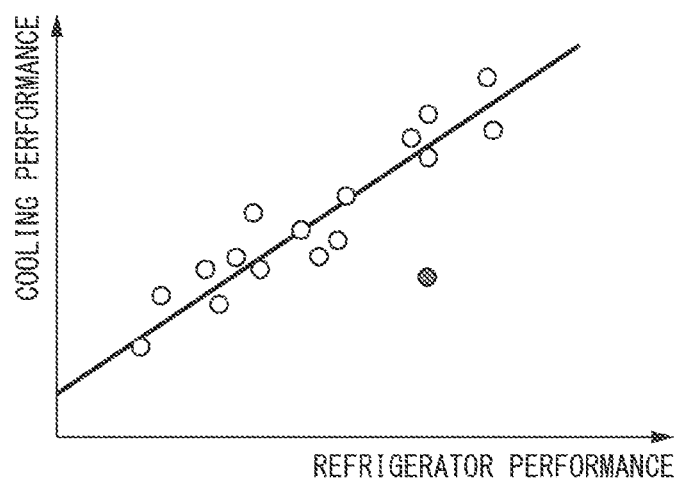
FIG. 5A is a schematic diagram illustrating an example of application development by the application development environment providing system according to the embodiment.
FIG. 5B is a schematic diagram illustrating an example of application development by the application development environment providing system according to the embodiment.

On an analysis screen of the application development environment providing system, the developer analyzes a cooling performance of the six refrigerators using data of two years into the past provided from the historian. A cooling performance Ln can be obtained, for example, using a calculation equation Ln=exhaust temperature/intake air temperature. The developer performs multiple regression analysis on the basis of "refrigerator performance" representing the performance of all the six refrigerators that is a known value and the cooling performance Ln obtained above. Then, for example, a distribution diagram as illustrated in FIG. 5A is displayed on the analysis screen. Accordingly, the developer can confirm that an original refrigerator performance of the refrigerators and an actual cooling performance do not greatly deviate from each other since measurement points are aligned substantially linearly.

Next, the developer calculates a performance coefficient (for example, Ln) indicating an actual performance of each of the six refrigerators. For example, a value of a performance coefficient for each refrigerator as illustrated in FIG. 5B may be calculated. Using the performance coefficients, for example, the developer may recognize that an actual performance of a specific refrigerator is lower than an original performance. The developer reports a refrigerator of which performance is degraded to the customer using the e-mail transmission and reception function of the application development environment providing system.

Next, the developer develops the application in which the algorithm for automation of the driving control pattern is incorporated, on the basis of the above analysis results. First, on a design screen of the application development environment providing system, the developer disposes development parts indicating the logic model as illustrated in FIG. 4 and connects the development parts to development parts indicating respective input and output data items. The developer displays a logic model creation screen on the display of the application development environment providing system.

Figure 6:
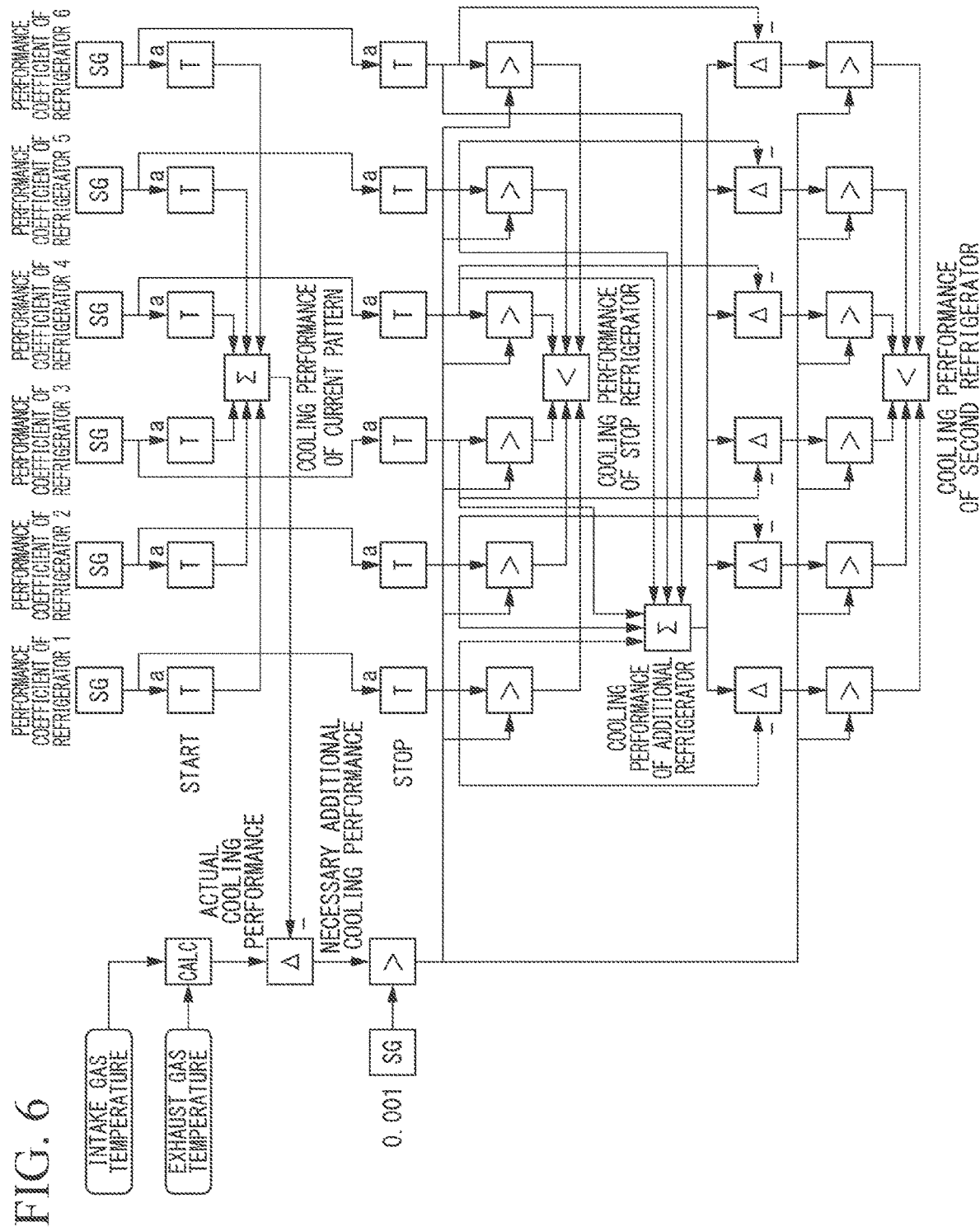
FIG. 6 is a schematic diagram illustrating an example of application development by the application development environment providing system according to the embodiment.

For example, a logic model (algorithm) as illustrated in FIG. 6 is displayed on the logic model creation screen. In the logic model, various coefficients or the like calculated above are also displayed, in addition to the input and output data items. On the logic model creation screen, the developer completes a logic model indicating a logic of a process that is performed by the application. The developer simulates the created logic model using past data acquired from the historian. Using the result of the simulation, for example, the developer can a recognize power consumption or the like that is reduced by controlling the driving of the refrigerator using the created logic model.

Figure 7:
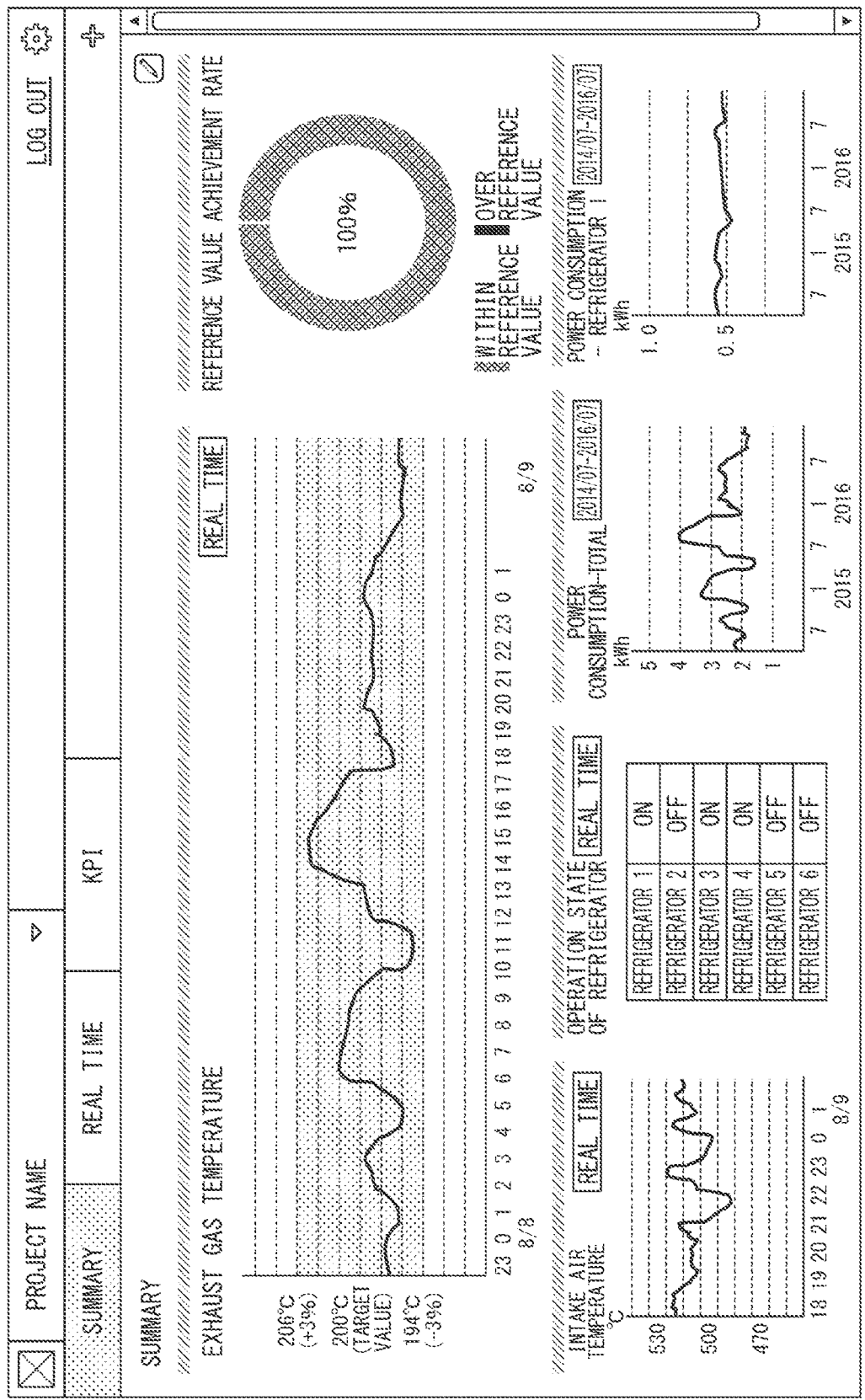
FIG. 7 is a schematic diagram illustrating an example of application development by the application development environment providing system according to the embodiment.

Next, the developer creates a KPI dashboard screen in the application development environment providing system. The KPI dashboard screen is a screen for monitoring an operation situation of the application that controls the operation of the six refrigerators for adjusting the exhaust gas temperature, which has been developed by the above procedure. The KPI dashboard screen is, for example, a screen as illustrated in FIG. 7. As illustrated in FIG. 7, the KPI dashboard screen displays a situation of the exhaust gas temperature in real time using a display of a band shape indicating a range in which an allowable range of variation from a target value is ±3% and a line graph of an achieved value. As illustrated in FIG. 7, the KPI dashboard screen displays, for example, an intake air temperature and an ON/OFF state of the switches of the six refrigerators as reference values in real time. For example, the KP1 dashboard displays an alarm when it is detected that the cooling performance of the refrigerator has been degraded. The KPI dashboard is implemented as one function of the application developed by the developer above.

According to a flow of the embodiment described above, the developer performs application development using the application development environment providing system and provides the developed application to the customer.

The application development environment providing system of the present invention may include a construction function unit (not illustrated) that constructs an application program. This construction function unit may prepare, for example, as development parts, respective operations that are performed in plant driving as a process part icon (not illustrated), align the process part icons on the screen according to a desired logic configuration, program configuration, or driving conditions or procedures, or the like, and define the connection conditions of the respective icons, thereby constructing a logic configuration diagram or a work procedure diagram and creating an application program of the work procedure diagram. This construction function unit is configured to enable a user (a driver) to construct an application program easily and intuitively. Hereinafter, a configuration and an operation will be described.

The construction function unit also enables the user to create new icons. A process part icon (not illustrated) represents a logic configuration, a device attribute, or content of a work with a picture. A ready-made program for performing a process of an icon is prepared for the process part icon. The process part icon and the ready-made program are associated with each other.

The construction function unit arranges the process part icons on the screen, connects the icons to each other, defines input and output conditions between the icons at the time of the connection, and sets parameters for the icon corresponding to a logic so that a desired operation is performed. Accordingly, when the construction function unit constructs the logic configuration diagram or the work procedure diagram, the construction function unit accordingly generates information on an order added to icons, connection information of the icons, and the like. The construction function unit constitutes the application program corresponding to the work procedure chart using a ready-made program in which the generated information is associated with the icons.

The application development environment providing system of the present invention may include a driving function unit (not illustrated) that executes an application program created by the construction function unit (for example, performs plant driving).

According to the application development environment providing system of the present invention, starting and stopping of an operation can be performed by a simple operation using a mouse operation in units of process part icons, units of process units, and units of work flows. According to the application development environment providing system of the present invention, it is possible to display various messages for an alarm, guidance, and the like as necessary during driving, and allow progress of safe and reliable driving.

The construction function unit may include an icon storage means, an icon connection means, an information generation means, and a driving execution means, which will be described below.

The icon storage means stores an icon representing each work to be performed in plant driving with a picture and a ready-made program for executing the work of this icon in association with each other. The icon connection means selects icons from the icon storage means, and connects the selected icons on a screen of the displaying means to create a logic configuration diagram or a working procedure diagram showing a logic configuration or a working procedure of the plant driving on the screen.

The information generation means generates information for executing the application program based on the logic configuration or work procedure created by the icon connection means. Examples of the information to be generated include information on an order attached to the icons, and connection information on the icons. The information (execution information) generated by the information generation means is stored in the storage means.

The driving execution means executes the program associated with the information generated by the information generation means and the icon in the work procedure diagram according to the program configuration or the work procedure displayed on the screen (for example, the plant driving is executed and the plant is operated by the driving execution means).

The input means is provided, for example, in order to perform an input operation necessary for plant driving with a mouse, a keyboard, or the like. When the program configuration displayed on the screen or the icon in the work procedure diagram is specified by the input means, the operation executing means may execute work corresponding to the designated icon. Accordingly, it is possible to execute the program directly through a screen operation.

The icon indicating an exception process and the ready-made program for executing the process of this icon may be stored in association with each other in the icon storage means. An icon indicating a normal process and a program thereof are also stored in the icon storage means. In this case, when the exception process is generated, the icon connection means connects the icons stored in the icon storage means on the screen to create a work procedure diagram of the exception process on the screen.

The information generation means may generate information for executing the work procedure of the exception process created by the icon connection means. Information (exception process execution information) generated by the information generation means is stored in the storage means.

The exception process execution means executes the exception process according to the work procedure diagram of the exception process (for example, executes plant driving) on the basis of the program associated with the exception process execution information generated by the information generation means and the icon in the work procedure diagram. The exception process determination means may determine whether or not the exception process is generated.

Details of Embodiments

Hereinafter, embodiments of the present invention will be described in detail with reference to the drawings.

Figure 8:
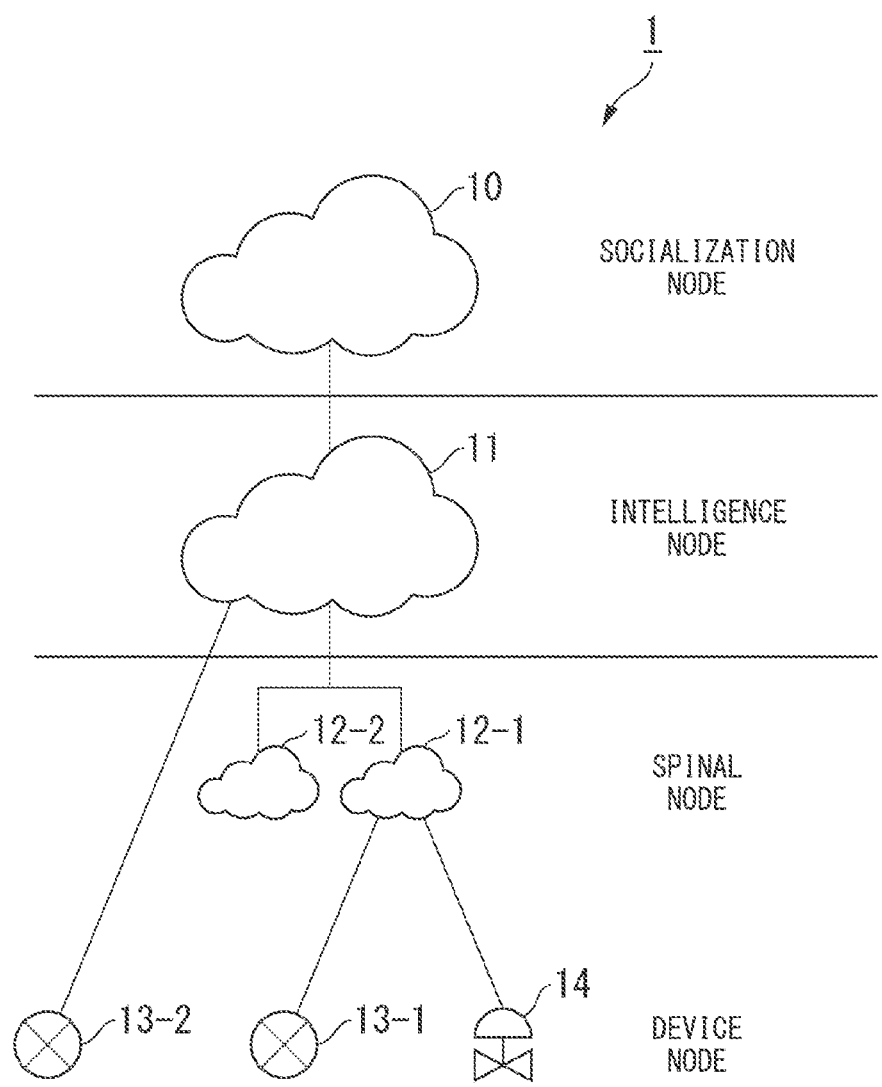
FIG. 8 is a schematic diagram illustrating an overview of a system of the application development environment providing system according to the embodiment of the present invention.

FIG. 8 is a schematic diagram illustrating an overview of a system of the application development environment providing system 1 according to the embodiment of the present invention. As illustrated in FIG. 8, the application development environment providing system 1 is a system configured in a hierarchical structure of four layers including a device node, a spinal node, an intelligence node, and a socialization node in a cloud computing environment.

The device node includes various sensors, various devices, and various systems. Examples of the various sensors include a temperature and humidity sensor, a pressure sensor, and a flow rate sensor. Examples of the various devices include a programmable logic controller (PLC) that is a control device, on-board diagnostics (OBD: self-malfunction diagnosis) device connected to a controller area network-BUS (CAN-BUS: bus type control network) in a vehicle, a key performance indicator (KPI) monitor, a display that displays a current value of a specific sensor, a lamp, a buzzer, a valve, and a robot arm. Examples of the various systems include a DCS, a drone control system, an intrusion detection system, a security system to which an entrance badge reader is connected, and a building automation system to which a lighting, a door lock, an elevator, a sprinkler, or the like is connected.

In the application development environment providing system 1 illustrated in FIG. 8, a device node 13-1 and a device node 13-2 constituted by a sensor, and a device node 14 constituted by an actuator are included on a layer of the device node. Hereinafter, the device node 13-1, the device node 13-2, and the device node 14 may be simply referred to as device nodes 13-14 when the device node 13-1, the device node 13-2, and the device node 14 are collectively referred to without being distinguished from each other.

The device nodes 13-14 of the application development environment providing system 1 according to the embodiment are constituted by two sensors and one device in order to simplify the description, but the present invention is not limited thereto. The device nodes 13-14 can be arbitrarily configured by one or more sensors, devices, systems, and the like. In general, a large number of sensors, devices, systems, and the like may be often accommodated for one spinal node.

Examples of the sensor, the device, the system, and the like constituting the device nodes 13-14 include a device that transmit data, a device that receives and displays data, and a device that receives data and causes an action. The sensor, device, system, or the like is, for example, a device compatible with plug-and-play. The sensor, device, system, or the like is, for example, a device having a function of communicating simultaneously with a plurality of applications.

Examples of the device nodes 13-14 include a device that communicates with the device constituting the spinal node, a device that is communicatively connected to the device constituting the intelligence node.

Examples of the device nodes 13-14 communicatively connected to a device constituting the spinal node include a device that requires real time, a device that is used for an application in which data delay (data communication delay) or fluctuation (variation in a data communication speed), or the like is not permitted, and a device in which there is concern that a communication band is tightened when the device is directly connected to the intelligence node in order to generate a large amount of data.

Meanwhile, examples of the device nodes 13-14 communicatively connected to the device constituting the intelligence node include a device that is used for a purpose not affected by delay, fluctuation, or the like, a device that is installed in a remote place, which needs to pass through a wireless communication networks such as a mobile telephone network or a satellite line, and a device to be moved.

The device node 13-1 and the device node 14 are connected to the device constituting the spinal node over the internet via a network interface such as Ethernet (registered trademark) and a plurality of routers or switches. Further, the device node 13-2 is connected to the device constituting the intelligence node over the internet via a network interface such as Ethernet (registered trademark) and a plurality of routers or switches. The device nodes 13-14 are communicatively connected to the device constituting the spinal node or the device constituting the intelligence node by Internet Protocol (IP).

The spinal node (first network) is constituted by a server device and functions as a gateway. In the application development environment providing system 1 illustrated in FIG. 8, layers of the spinal node include a spinal node 12-1 and a spinal node 12-2. Hereinafter, the spinal node 12-1 and the spinal node 12-2 are collectively referred to as a spinal node 12 when it is not necessary to particularly distinguish between the spinal node 12-1 and the spinal node 12-2.

A server device constituting the spinal node 12 (hereinafter also simply referred to as a spinal node 12) is a server device that accommodates at least one of the device nodes 13-14 in a cloud computing environment (that is, logically connects the device node, manages the device node, or performs data input and output to and from the device node 1). The spinal node 12-2 originally accommodates at least one of the device nodes 13-14 like the spinal node 12-1, but description thereof is omitted in FIG. 8 for simplicity of description.

The spinal node 12 is generally a device called a gateway server, a fog computer, an edge computer or the like, for example. The spinal node 12 is installed between a server device (the socialization node 10 and the intelligence node 11 in the embodiment) in a cloud computing environment and a sensor, a device, and a system constituting the device nodes 13-14.

The spinal node 12, for example, receives data from the device nodes 13-14 that perform communication according to a communication protocol with which the intelligence node 11 cannot perform communication. The spinal node 12 transmits the received data to the intelligence node 11 according to a communication protocol with which the intelligence node 11 can perform communication. Accordingly, the spinal node 12 transfers data from the device nodes 13-14 to the intelligence node 11. For example, the spinal node 12 receives a signal transmitted from an analog sensor or the like that cannot perform communication according to an Internet protocol, according to a communication protocol other than the Internet protocol. The spinal node 12 digitally converts the received signal, normalizes the signal, and then transmits the normalized signal to a server device constituting the intelligence node 11 (hereinafter also simply referred to as an "intelligence node 11") through communication based on the Internet protocol. Accordingly, the spinal node 12 transfers data from the device nodes 13-14 to the intelligence node 11.

For example, the spinal node 12 receives data transmitted from the device nodes 13-14, performs a process such as calculation, interpretation, and determination on the received data, and transmits a result of the process to the intelligence node 13.

The spinal node 12 acquires, for example, data from the device nodes 13-14, performs preprocessing on the data, adds a time stamp (a symbol indicating a generation time) to generate time series data, acquires a logic, an algorithm, or the like for processing the time series data from the intelligence node 13, and executes a process (a process such as processing or a determination) for the time series data on the basis of the logic, the algorithm, or the like.

The spinal node 12, for example, transmits the time series data to the intelligence node 11 as necessary or on the basis of an instruction from the intelligence node 11. The spinal node 12 transmits a control signal indicating an action generated on the basis of the time series data and the logic, the algorithm, or the like to the appropriate device nodes 13-14.

The spinal node 12 temporarily stores time series data in a time series database (not illustrated) provided in the spinal node 12. At the same time, the spinal node 12 transmits the time series data to the intelligence node 13 in response to a request from the intelligence node 11. Further, the spinal node 12 transmits the time series data temporarily stored in the time series database asynchronously from old data in order to a historian (not illustrated) via a communication route in which security has been secured. The historian may be directly connected to the intelligence node 11. In this case, the intelligence node 11 can refer to and use the historian as there is the historian in a local environment.

In a case in which the spinal node 12 is constituted by a single piece of hardware, the device nodes 13-14 communicatively connected to the spinal node 12 may transmit data to the two or more spinal nodes 12 in parallel in preparation for a case in which a failure or abnormal operation occurs in the spinal node 12. When the device nodes 13-14 are devices that perform communication using an Internet protocol, redundancy may be performed by the device nodes 13-14 transmitting data, a control signal, and the like to the communication network using a technique such as multicasting or broadcasting, and a plurality of spinal nodes 12 receiving the data, the control signal, and the like in parallel.

The socialization node 10 (second network) and the intelligence node 11 include, for example, a server device and a network device that provide a cloud computing environment. The socialization node 10 and the intelligence node 11 may be physically separated by separate devices or may be logically separated in a single device.

A device constituting the socialization node 10 (hereinafter also simply referred to as a "socialization node 10") provides a function of enabling an application development environment or an application execution environment to be shared beyond boundaries of enterprises and organizations, such as among a plurality of enterprises (hereinafter also referred to as "tenants") that jointly develop applications, between an enterprise providing applications and enterprise customers that use applications, and between an enterprise and an individual.

A device constituting the intelligence node 11 provides a function for enabling an application development environment or an application execution environment to be shared among organizations (hereinafter also referred to as "sites") such as a plurality of departments or groups that jointly develop applications within an enterprise, and among a plurality of employees (hereinafter also referred to as "accounts").

Hereinafter, an application development environment, an application execution environment, and a communication environment in the present invention that can be shared among enterprises, among enterprises and individuals, and among users within enterprises, which are constituted by the intelligence node 10, the socialization node 11, and the spinal node 12, are collectively referred to a co-innovation space.

The socialization node 10 and the intelligence node 11 operate in the server device as described above, and the co-innovation space is implemented in the socialization node 10, the intelligence node 11, and the spinal node 12. The intelligence node 11 has a main function of the co-innovation space. On the other hand, the socialization node 10 has a function required in a case in which sharing or trading of application programs, communication, and the like are performed, for example, between enterprises or between an enterprise and an individual among functions of the co-innovation space.

The intelligence node 11 performs management of the spinal node 12 that is communicatively connected to the intelligence node 11, and management of the device nodes 13-14. The user accesses the socialization node 10 and the intelligence node 11 through a human machine interface (HMI) and uses the co-innovation space.

The socialization node 10 and the intelligence node 11 include various external interfaces for cooperating with various external systems. For example, the socialization node 10 and the intelligence node 11 can cooperate with external IoT and IIoT cloud computing environments, external charging systems, external database systems, and the like. Thus, since the socialization node 10 and the intelligence node 11 can cooperate widely with various external systems, the socialization node 10 and the intelligence node 11 can construct the co-innovation space and an application on the co-innovation space widely cooperating with various external systems in various IoT cloud computing environments.

Since the socialization node 10 and the intelligence node 11 includes the various external interfaces for cooperating with various external systems, the socialization node 10 and the intelligence node 11 can utilize a group of interfaces that are provided by the IoT and IIoT cloud computing environments. Therefore, it is possible to develop solutions for an entire supply chain and an entire life cycle of a business process in a client enterprise.

The co-innovation space is a virtual space in the cloud computing environment, and is a space for application co-innovation that is separated safely from each other, which is separated in units of enterprises (tenants), in units of organizations (sites), or the like.

Using an architecture of the co-innovation space, for example, it is possible to develop applications for performing, for example, consultation, various controls, asset management, remote sensing, remote monitoring, KAIZEN (improvement) activity support using big data, and to develop systems such as an MES or a DCS.

The co-innovation space may also be implemented in a server device of a data center in a local environment, instead of being implemented in a cloud computing environment.

The architecture of the co-innovation space described above may be provided by one or a plurality of devices constituting the intelligence node 11 and the socialization node 10. A storage region in the architecture of the co-innovation space may be a storage of one or a plurality of devices constituting the intelligence node 11 and the socialization node 10 or may be constituted by combining a plurality of some of storage regions of storages included in a plurality of devices.

(Functional Configuration of Co-Innovation Space)

Hereinafter, a functional configuration of the co-innovation space will be described.

Figure 9:
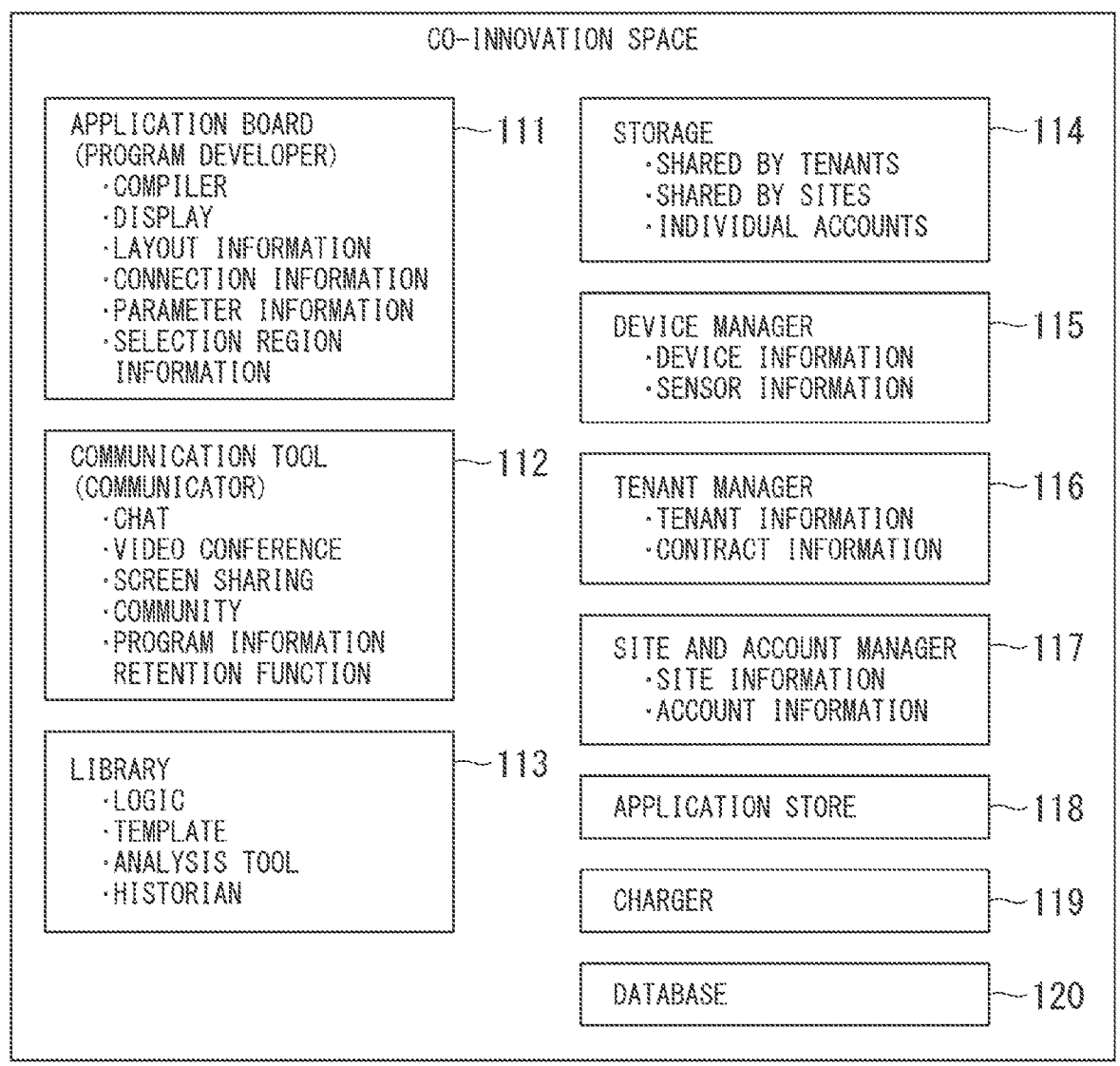
FIG. 9 is a functional configuration diagram of a co-innovation space implemented in the application development environment providing system according to the embodiment of the present invention.

FIG. 9 is a functional configuration diagram of a co-innovation space implemented in the application development environment providing system 1 according to the embodiment of the present invention. As illustrated in FIG. 9, the intelligence node 11 includes an application board 111, a communication tool 112, a library 113, a storage 114, a device manager 115, a tenant manager 116, a site and account manager 117, an application store 118, a charger 119, and a database 120.

The application board 111 (a program developer) provides a user with multi-tenant, multi-site, multi-account application development environment, and an application execution environment. The application board 111 has functions such as a compiler, and a display that can visually display an application program to the user. The display displays an image showing the co-innovation space, and visually displays the application program on the basis of layout information, connection information, parameter information, selection region information, and the like in the co-innovation space.

The layout information is information indicating a form of a process of an application program that is a development target. For example, the layout information includes information indicating that the application program that is a development target is an application that performs a multi-input two-output process, or that the application program that is a development target is an application that performs a multi-input multi-output process, or that the application program that is a development target is an application that performs a one-input multi-output process.

The connection information is information on conductors, which is defined when a diagram visually indicating a relationship between data items or logics by connecting input data items, logic serving as content of a process, and output data items serving as results of the process using the conductors in an application program that is a development target is generated.

The parameter information is information indicating setting values of various parameters set in the application program that is a development target.

The selection region information is information indicating a part of a process selected (designated) by an operation or the like of the user among a series of processes of the application program that is a development target. For example, with respect to an application program visually displayed by the application board 111, the user operates a mouse or the like so that a region of part of the application program is surrounded. Accordingly, selected region information indicating the surrounded region is generated.

A user having an account linked to the tenant or the site, for example, can create, manage, and execute the application program using a screen (hereinafter also referred to as a co-innovation space screen) displayed by the display of the application board 111 while sharing data, logics, applications, and the like with other users on the basis of an access authority and an execution authority preset or set by the administrator.

When the user develops the application program, the user selects, for example, necessary development parts from the list of the various development parts (for example, the data item for the input data, the logic that is content of the process, data item for processing result data, and the like described above) in the application board 111. Thereafter, the user drags and drops the selected development parts to the application design region through a mouse operation or the like. Accordingly, the selected development parts are displayed in the application design region. The user performs, for example, a dragging mouse operation or the like so that the selected development parts are connected by a conductor in the application design region. Accordingly, a flow of a process of the application program that is a development target is defined, and the application program is generated.

When the user develops the application program, the user selects necessary application, template, logic, and the like from the list of various general-purpose applications, various general-purpose templates, various general-purpose logics, or the like on the application board 111. Thereafter, the user drags and drops the selected application, template, logic, or the like to the application design region through a mouse operation or the like. Accordingly, the user can develop the application program using the selected application, template, logic, and the like.

The application, template, logic, and the like registered in the list may be either paid or free. In this case, when the user has used the paid application, template, logic, or the like, a charging process is performed by the charger 119 to be described below.

An access authority is set for various types of information (for example, input and output data, information indicating the content displayed on the display, the application program that is a development target, information indicating content of comments exchanged among a plurality of developers in joint development, and information indicating a state of development) used in the application board 111 such that only access from the account belonging to a specific tenant designated in advance or a specified site designated in advance is possible.

Thus, since the co-innovation space has a structure in which various types of information can be shared among users while the access authority being managed, an environment in which the application programs can be safely co-innovated while information leakage or the like being prevented is provided.

The communication tool 112 provides a chat function, a video communication function, a voice communication function, a screen sharing function, a community function such as a bulletin board or a social network service (SNS), and the like, which are used among users. For example, with the chat function, not only text data (for example, source code), image data, an executable file of a program, and the like, but also some or all of application programs that are development target, including setting information such as parameter values, can be transmitted or received and shared between users.

For example, the user can share the application program with another user by dragging and dropping, through a mouse operation or the like, the region indicating the part of the application program selected by surrounding through a mouse operation or the like and pasting the region to a chat screen. For example, when a graph created by data updated in real time is pasted on the chat screen, the graph displayed on the chat screen is also updated in real time. Further, the graph displayed on the chat screen of the co-innovation space referenced by other users is similarly updated in real time.

Thus, according to the co-innovation space, since the application development environment and the communication tool seamlessly cooperate, it is possible to easily and flexibly achieve communication for co-innovation of applications between users.

A community is a function of allowing communication to be achieved among a plurality of users in real time or non-real time. For example, the community is a function such as a bulletin board, a comment list, and an SNS. The access from each user to the community is limited in a range based on an access authority set by a management policy that is set for each tenant. Topics written by the user using the community function may be subjected to narrowing-down search by various narrowing-down conditions (for example, a task, region, industry, and keyword).

Thus, the user, for example, can exchange opinions with a user having an account belonging to the same tenant or site or a user having an account belonging to different tenants or sites using the communication tool 112. Accordingly, it is possible for a plurality of users to co-innovate application programs.

The library 113 provides, for example, generic processing logic, template, analysis tool, and historian (database in which historical information or achievement information is stored) which are used when an application program is developed or executed on the application board 1111.

For example, the library 113 stores various analysis tools, such as a similar waveform search tool, a regression analysis tool, a multiple regression analysis tool, an MT method analysis tool, an error variance analysis tool, a data driven modeling tool, a deep learning tool, and a correlation analysis tool. The user can perform various types of analysis by dragging and dropping an arbitrary analysis tool to the application design region and inputting data The storage 114 divides various types of information (for example, developed application programs or analysis result data) into publicly opened information, tenant shared information, site shared information, and individual account information, and stores the publicly opened information, the tenant shared information, the site shared information, and individual account information in a storage region for public disclosure, a storage region shared by tenants, a storage region shared by sites, or a storage region for individual accounts. The storage region in which each user can store various types of information may be controlled on the basis of the authority set in advance for each user by the administrator of the tenant. The storage 114 may be a storage medium such as a hard disk drive (HDD), a flash memory, an EEPROM, a random access memory (RAM), a read only memory (ROM), or any combination thereof.

The device manager 115 manages information on a sensor, a device, a system, and the like constituting the device nodes 13-14 accommodated by the intelligence node 11. For example, the device manager 115 manages information in which identification information given to the device nodes 13-14 is associated with identification information of an account, a site, and a tenant, which is used for accommodating the device nodes 13-14.

The device manager 115 of the intelligence node 11 may acquire and manage the information on a sensor, a device, a system, and the like constituting the device nodes 13-14 accommodated by the spinal node 12 via the spinal node 12. Alternatively, the spinal node 12 may manage the information, and the device manager 115 of the intelligence node 11 may acquire the information from the spinal node 12.

The tenant manager 116 manages various types of information on a tenant (enterprise). For example, the tenant manager 116 performs setting, change, deletion, and the like on information such as basic information, billing information, operation authority, and authorization authority of the tenant. For example, the tenant manager 116 manages contract information on a contract related to use of the co-innovation space and use of paid or free applications, tools, templates, data, and the like for each tenant.

The site and account manager 57 manages various types of information on the site (an organization) and the account (a user). For example, the site and account manager 57 performs setting, change, deletion, and the like on information such as basic information of the site and account, billing information, operation authority, and approval authority.

The application store 58 is a function for allowing a user to purchase and sell a part or all of an application program, a logic, a template, data, and the like (hereinafter simply referred to as an application or the like). For example, when the user develops an application program, the user selects an application or the like that the user desires to purchase from the list of applications or the like that is sold by the application store 118 on the co-innovation space screen. The user drags and drops the selected application or the like to the application design region through a mouse operation or the like. Accordingly, the user can purchase the selected application or the like and use the selected application or the like for development of the application programs or the like.

An application or the like sold by the application store 118 may be charged according to an arbitrary charging method such as monthly charge, annual charge, charge according to usage, or one-time charge. A specific application or the like among applications or the like sold by the application store 118 may not be charged since a certain period (for example, one month) from a date on which the user has started using the application is a free trial period.

The charger 119 performs a charging process for a user who has purchased an application or the like sold by the application store 118. The charger 119 may perform a charging process for use of the co-innovation space. A charge destination may be registered in advance for each tenant, site, or account.

When the purchased application or the like is an application or the like registered in the application store 58 by the user, a part of the amount collected by charging the user who has purchased the application or the like may be paid to a user who has registered the application or the like.

The database 120 holds, as a database, data such as production management information, plant driving management information, and quality information necessary for an operation of the application, and provides necessary data according to a request of the application. This database may be, for example, a general SQL database or may be a non-SQL database for a specific purpose. This database may be set for each tenant, site, or account, and the administrator may individually set an access authority according to the content of data. For these databases, an external database outside the co-innovation space may be referred to.

(Example of Display in Application Board)

Figure 10:
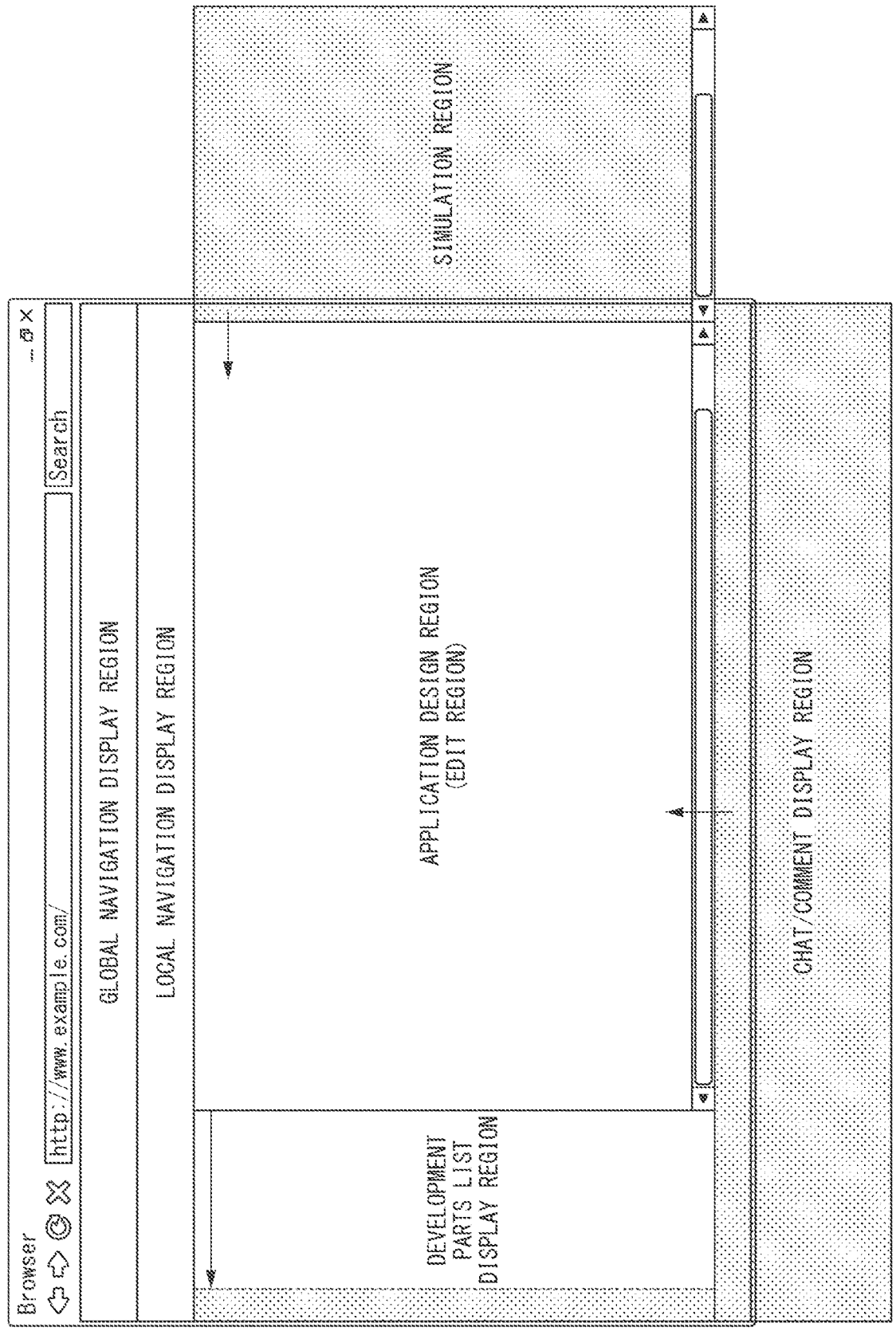
FIG. 10 is a diagram illustrating an example of a display in an application board of the application development environment providing system according to the embodiment of the present invention.
Figure 11:
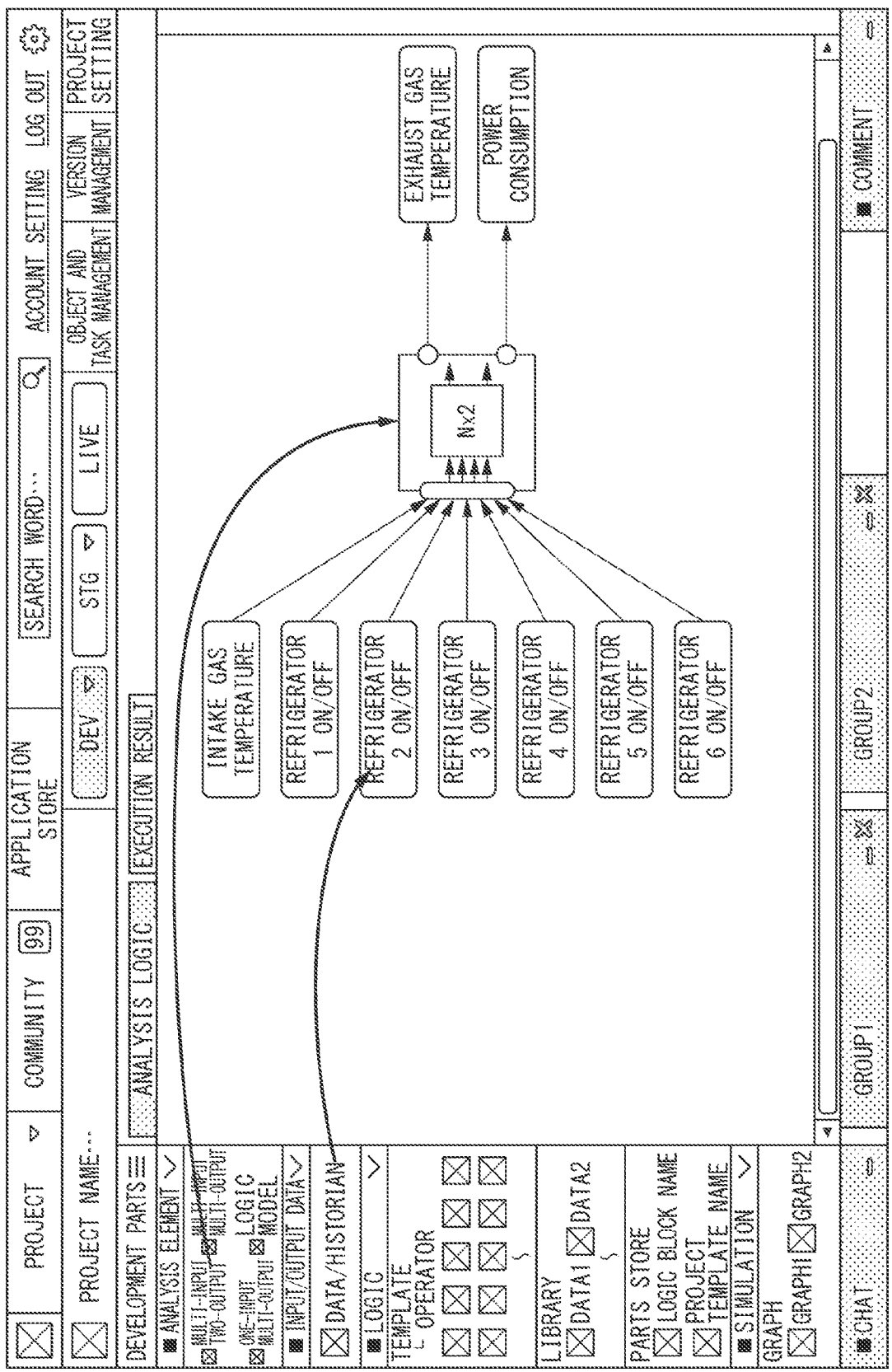
FIG. 11 is a diagram illustrating an example of a display in an application board of the application development environment providing system according to the embodiment of the present invention.
Figure 12:
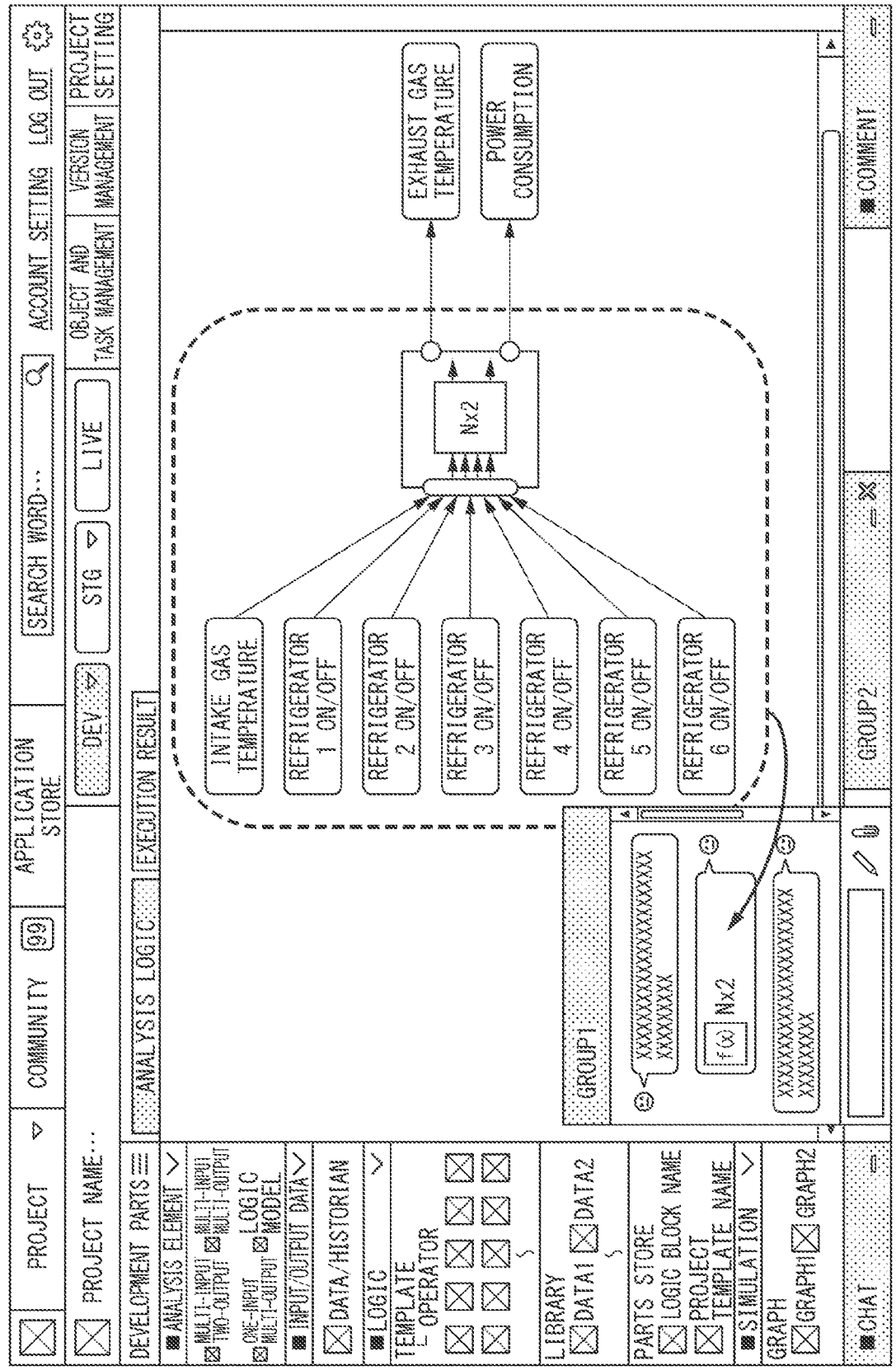
FIG. 12 is a diagram illustrating an example of a display in an application board of the application development environment providing system according to the embodiment of the present invention.

Hereinafter, an example of a screen (a co-innovation space screen) that is displayed on the display of the application board 111 will be described. FIGS. 10 to 12 are diagrams illustrating an example of a display in the application board of the application development environment providing system according to the embodiment of the present invention.

FIG. 10 illustrates an example of a layout of each screen region constituting the co-innovation space screen. As illustrated in FIG. 10, the co-innovation space screen includes four screen regions including an application design region (editing region), a global navigation display region, a local navigation display region, and a development part list display region.

According to an operation of the user, the development parts list display region slides in a left direction of the screen and moves out of the screen, thereby being switched from a displayed state to a non-displayed state. Accordingly, since the application design region is widened, it is easy for the user to perform the work of editing the application program.

In response to an operation of the user, the simulation region and the chat/comment display region which are not displayed at the time of start of the co-innovation space screen are switched to the displayed state. As illustrated in FIG. 10, the simulation region slides from a right direction of the screen and moving into the screen, thereby being switched from the non-displayed state to the displayed state. A chat/comment region slides from a downward direction of the screen and moves into the screen, thereby being switched from the non-displayed state to the displayed state.

Accordingly, the user can cause the simulation region and the chat/comment display region to be displayed on the display only when necessary, and widely secure the application design region by hiding the screen regions when the screen regions are not necessary. Therefore, it is easy for the user to perform the work of editing the application program.

The application design region is a screen region for visually displaying the structure of the application program that is a development target. The user selects, for example, necessary development parts from the development parts displayed in the development parts list display region, such as a list of various analysis elements, various data items for input and output data, logic that is content of a process, various applications, various templates, various logics, various graphs, various analysis tools, and the like. Thereafter, the user can cause the image showing the selected development parts to be displayed in the application design region by dragging and dropping the image to the application design region through a mouse operation or the like.

The user can cause a conductor line linking the two development parts to be displayed in the application design region, for example, by dragging a region between two development parts displayed in the application design region through a mouse operation or the like. By performing such an operation, the user can visually design and edit the application program that is a development target.

The user can select, for example, a region of a part of the application program that is a development target by surrounding the region of the part of the application program which is a development target visually displayed in the application design region through a mouse operation or the like. For example, the user can share the region of the part of the selected application program with other users by dragging and dropping the region of the part of the selected application program through a mouse operation or the like and pasting the region of the part of the selected application program to the chat screen.

The user selects, for example, necessary development parts from a list of a part or all of the application programs displayed in the application store displayed in the global navigation display region, the logic, the templates, the data, and the like. Thereafter, the user can drag and drop the development parts to the application design region through a mouse operation and cause the development parts to be displayed in the application design region. Accordingly, the user can purchase necessary development parts from the application store and immediately use the development parts.

The user selects a region of a part or all of the application program which is a development target visually displayed in the application design region through a mouse operation or the like. Thereafter, the user drags and drops the selected region to the application store displayed in the global navigation display region through a mouse operation or the like. Accordingly, the part or all of the selected application program is registered in the application store, and information (for example, including an icon image or the like) indicating the part or all of the application program is displayed in the application store. Thus, the user can sell, for example, a part or all of the developed application program to other users in the application store.

The global navigation display region is a screen region in which a common menu screen is displayed in a tenant (an enterprise) or a site (an organization). For example, menus for using functions such as login/logout, account setting, project switching, search, and an application store are displayed in the global navigation display region.

The local navigation display region is a screen region on which a menu screen according to an account (user) is displayed. For example, menus for using functions such as object management, task management, version management, and project setting in the application program that is a development target are displayed in the local navigation display region.

The development parts list display region is a screen region in which a list screen of development parts that are used for development of application programs is displayed. For example, various analysis elements, various input and output data items, various general-purpose applications, various general-purpose templates, various general-purpose logics, and various analysis tools (for example, a similar waveform search tool, a regression analysis tool, a multiple regression analysis tool, an MT method analysis tool, an error variance analysis tool, a data driven modeling tool, a deep learning tool, and a correlation analysis tool) described above are categorized and listed in the development parts list display region.

The simulation region is a screen region for displaying setting information for simulatively executing (simulating) application programs displayed in the application design region, information indicating simulation results, and the like.

The chat/comment region is a screen region for displaying a chat screen which is a function for allowing a user to exchange messages in real time or non-real time with respect to an application program or the like that is a development target with other users, or a list of comments or the like recorded in the past by the user or another user. A message or comment displayed in the chat/comment region is selected through a mouse operation of the user or the like. The selected message or comment is posted to an arbitrary position in the application design region through an operation such as drag and drop to the application design region.

FIG. 11 illustrates an example of a screen when the user selects an arbitrary development part displayed in the development part list display region on the co-innovation space screen and uses the selected development part in the application design region.

As illustrated in FIG. 11, an image visually showing an application program that is a development target, in which seven input data items such as "intake gas temperature", "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF", the analysis element such as "Nx2", and two output data items such as "exhaust gas temperature" and "power consumption" are connected by arrows (conducting lines), is displayed in the application design region.

As illustrated in FIG. 11, a list of development parts classified into categories "analysis element", "input and output data", "logic", and "simulation" is displayed in the development part list display region.

When the user creates an application program in the application design region of FIG. 11, the user first selects a development part "multi-input two-output" from among the development parts in a column "analysis element" displayed in the development part list display region. Thereafter, the user drags and drops the selected development part to the application design region through a mouse operation or the like. Then, an image of an analysis element in which a text "Nx2" representing multi-input two-output is written is displayed in the application design region.

Next, the user selects a development part "data/historian" from the development parts in the column "input and output data" displayed in the development part list display region. Thereafter, the user drags and drops the selected development part to the application design region through a mouse operation or the like. Then, an image showing data/historian is displayed in the application design region.

The user opens a screen (not illustrated) for selecting a data item for the displayed image showing data/historian, and displays a data item list included in the data/historian. When the user selects an input data item "intake gas temperature" from the displayed data item list, a text "intake gas temperature" is displayed in the image showing the historian and the data. Thus, the user can add input data items to the application design region.

Similarly, the user further adds input data items such as "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF" to the application design region.

Next, the user drags a region from the image showing the input data item "intake gas temperature" to the image showing the analysis element "Nx2" through a mouse operation or the like. Then, an image showing an arrow (a conductor) from the image showing the input data item "intake gas temperature" to the image showing the analysis element "Nx2" is displayed. Thus, the user can link the input data item to the analysis element in which the content of the process of the application program is defined.

Similarly, the user further links an image showing the input data items such as "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF" to an image showing the analysis element "Nx2" using arrows (conductive lines). Information indicating a connection from a certain development part to a certain development part is called connection information.

Next, the user adds the output data item to the application design region, similar to the operation when the input data item is added to the application design region in the above. When the user selects the output data item "exhaust gas temperature" from the data item list displayed on a screen (not illustrated) for selection of the data items, a text "exhaust gas temperature" is displayed in the image showing data/historian. Thus, the user can add the output data item to the application design region. Similarly, the user further adds an output data item "power consumption" to the application design region.

Next, the user drags a region from an image showing the analysis element "Nx2" to an image showing the output data item "exhaust gas temperature" though a mouse operation or the like, similar to the operation when the image showing the input data item is linked to the image showing the analysis element in the above. Further, the user drags a region from the image showing the analysis element "Nx2" to the image showing the output data item "exhaust gas temperature" though a mouse operation or the like. Thus, the user can link the output data item to the analysis element in which the content of the process of the application program is defined.

The user displays a screen (not illustrated) defining content of a process to be performed in the analysis element on the display, and defines content of a calculation process that is performed in the analysis element "Nx2". Accordingly, the user can develop an application program for performing a calculation process using data of seven input data items as an input value and outputting data of two output data items as a processing result.

Thus, since the application program that is a development target is visually displayed by the co-innovation space, the user can more intuitively develop applications or the like.

FIG. 12 illustrates an example of a screen when the user selects a region of a part of the application program displayed in the application design region on the co-innovation space screen and shares the selected part of the application program with other users using the chat function.

In the chat/comment display region on the co-innovation space screen illustrated in FIG. 12, a group chat screen on which message exchange is performed by a user belonging to "group 1" is displayed.

Hereinafter, an example in which the user shares a part of the application program displayed in the application design region with another user on the group chat screen will be described. The part of the application program in the example illustrated in FIG. 12 is assumed to be a part corresponding to a range of a process until the data of seven input data items is input and a calculation process is performed.

Among the images of the application program visually displayed in the application design region, the user selects a region by dragging through a mouse operation or the like to surround an image showing seven input data items such as "intake gas temperature", "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF", an image showing the analysis elements of "Nx2", and an image of arrows (conductors) connecting the seven input data items to the analysis elements. Then, as illustrated in FIG. 12, the selected region (that is, a movement trajectory of a pointer or the like by dragging) is displayed by a dotted line in the application design region. In the application program that is a development target, information indicating the selected region is referred to as selected region information.

Next, the user selects a region surrounded by the dotted line in the application design region. Thereafter, the user drags the selected region to the group chat screen of "group 1" through a mouse operation or the like. Then, the information indicating the part of the selected application program is displayed in the message display region of the group chat screen. In the example illustrated in FIG. 12, a notation "Nx2" and an icon are displayed in a message region of the group chat screen of "group 1".

Another user who has received the message through group chat drags and drops the notation "Nx2" or the icon displayed in the message region of the group chat screen from the message region to the application design region through a mouse operation or the like on the co-innovation space screen referred to by the other user. Then, the same image as an image of a range surrounded by the dotted line among the images displayed in the application design region used by the user who is a transmission source of the chat is displayed in the application design region referred to by the other user.

Information shared by the group chat includes not only information indicating the image or layout information, connection information, and selected region information indicating the structure of the application program, but also set parameter values and the like. That is, according to the co-innovation space, the information, including not only source code of the application program but also the set parameter values and the like, can be shared among users.

Thus, the co-innovation space has the application development environment and the communication tool, and the application development environment and the communication tool function in cooperation. Therefore, the user can easily share the developed application and the like with other users.

(Division Compilation)

Next, divided compilation by the application board 111 of the application development environment providing system 1 will be described.

For example, in industrial automation and production systems, like a process involving feedback such as PID control, a process that is required to be immediately executed in response to an input of data measured by a sensor or the like may be included. In a case where such a process is executed by a cloud computing environment, there is a case that a process such as control is not performed normally due to occurrence of delay, fluctuation, or the like in data communication.

In such a case, in order to reduce an influence of delay, fluctuation or the like in the data communication, the spiral node 12 executes the process which is required to be immediately executed, and the intelligence node 11 or the socialization node 10 executes the process which is not required to be immediately executed. In this case, the spinal node 12 accommodates a part of the device nodes 13-14 and functions as a gateway. Then, the process of the application program is performed normally by the mutual cooperation of both execution processes.

Conventionally, in order to generate an application program for performing execution processes respectively in a plurality of hierarchies (for example, the spinal node 12 and the intelligence node 11) in cloud computing and for cooperating the execution processes to implement a desired function, it was necessary to individually design and create an application program for each of the execution processes of the plurality of hierarchies. Further, it was necessary to make descriptions for cooperating the execution processes of the plurality of hierarchies with respect to each of the application programs, and to compile them individually to generate program execution files for each of the plurality of hierarchies.

By the application board 111 of the application development environment providing system 1 according to the present embodiment, a user can design the application program for performing each of the execution processes in the plurality of hierarchies without being conscious of generating the program execution file by dividing into a plurality of files.

First, the user designs and creates one application program without being conscious of generating the program execution file by dividing it into a plurality of files using the application board 111. Then, the application board 111 analyzes the generated application program, extracts a plurality of processes included in the application program, and classifies the extracted processes in accordance with a predetermined determination condition. For example, the application board 111 classifies them in accordance with whether a control cycle which is preset to the device nodes 13-14 controlled by the application program is equal to or less than a predetermined length or longer than the predetermined length.

The application board 111 executes a compilation (hereinafter, also referred to as division compilation) for each classified process group, and generates a plurality of program execution files for each classified process group. Then, the application board 111 causes the spiral node 12 to execute the program execution files generated by the process group whose control cycle is equal to or less than the predetermined length. The application board 111 causes the intelligence node 11 to execute the program execution files generated by the processing group whose control cycle is longer than the predetermined length.

Figure 13:
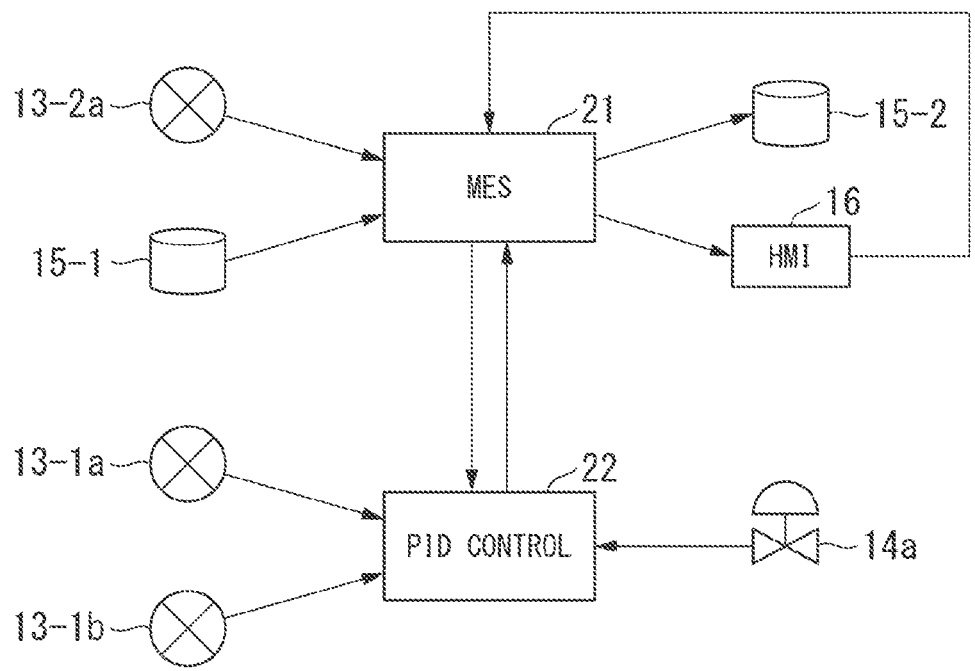
FIG. 13 is a schematic diagram illustrating an overview of a division compilation performed by an application board of the application development environment providing system according to the embodiment of the present invention.
Figure 14:
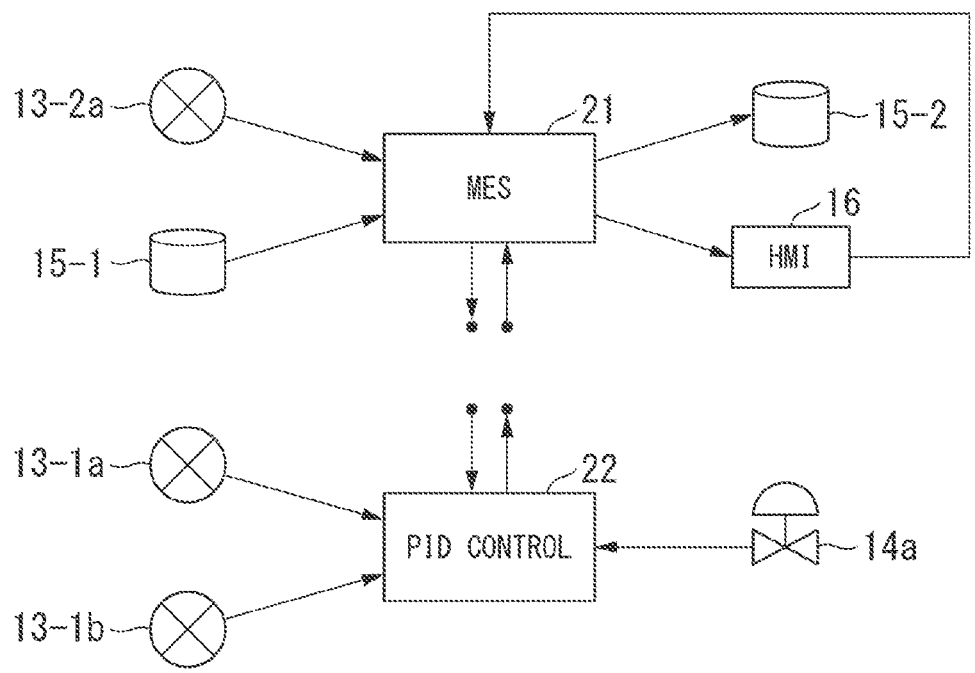
FIG. 14 is a schematic diagram illustrating an overview of a division compilation performed by an application board of the application development environment providing system according to the embodiment of the present invention.

An embodiment of the division compilation will be described below with reference to drawings. FIGS. 13 and 14 are schematic diagrams illustrating an overview of the division compilation performed by the application board 111 of the application development environment providing system according to the embodiment of the present invention. FIG. 13 is a schematic diagram illustrating data input/output in the application program before performing the division compilation. FIG. 14 is a schematic diagram illustrating data input/output in the application program after performing the division compilation.

As shown in FIG. 13, the application program generated in the present embodiment includes a HD control process 22 and an MES 21. The PID control process 22 is a process of acquiring data from each of the sensors constituting the device node 13-1*a* and the device node 13-1*b*, and controlling the devices constituting the device node 14*a*. The MES 21 is a process cooperating with the HD control process 22.

A parameter value for performing the PID control process 22 is determined in the MES 21. The determined parameter value is output from the MES 21 and set in the PID control process 22. When the MES 22 acquires information representing a control state of the device node 14*a* from the PID control process 22, the MES 22 acquires data representing a production plan or the like from the database 15-1, and acquires data from an external device node 13-2*a*. Thereafter, the MES 22 uses these acquired data to determine control contents for the PID control process 22. The determination result by the MES 22 is stored in the database 15-2 and displayed by the HMI 16.

The user generates an application program for executing the above-described process by the application board 111, and performs an operation to instruct the application board 111 to execute the compilation. When the application board 111 acquires information representing instructions for executing the compilation based on the operation by the user, the application board 111 classifies each process included in the application program before executing the compile. For example, the application board 111 classifies each process in accordance with whether or not the process is requested to execute immediately.

The application board 111 acquires, from the device node 14*a*, data representing the control cycle which is preset to the device node 14*a* controlled by the HD control process 22. For example, in a case where the acquired control cycle is equal to or less than the predetermined length (for example, 1 second), the application board 111 determines that the PID control process 22 is a process required to be immediately executed. Further, the application board 111 determines, for example, that the process of the MES 21 is not requested to execute immediately.

Next, the application board 111 divides the application program based on the above determination. That is, as shown in FIG. 14, the application board 111 divides it into an application program corresponding to a part for executing the PID control process 22 and an application program corresponding to a part for the process of the MES 21.

Then, in the application program corresponding to the process of the MES 21, the application board 111 gives information representing that a target of the data input/output is the PID control process 22 to a portion corresponding to the process of data input/output with respect to the PID control process 22. Similarly, in the application program corresponding to the PID control process 22, the application board 111 gives information representing that a target of the data input/output is the process of the MES 21 to a portion corresponding to the process of data input/output with respect to the process of the MES 21.

As a result, in the data output process from the process of the MES 21 to the PID control process 22, the application board 111 gives, to the application program that executes the process of the MES 21, information (first output destination process identification information) specifying the HD control process 22 as a data output destination. On the other hand, the application board 111 gives, to the application program that executes the process of the PID control process 22, information (second input source process identification information) specifying the process of the MES 21 as a data input source. Similarly, in the data output process from the PID control process 22 to the process of the MES 21, the application board 111 gives, to the application program that executes the PID control process 22, information (second output destination process identification information) specifying the process of the MES 21 as a data output destination. On the other hand, the application board 111 gives, to the application program that executes the process of the MES 21, information (first input source process identification information) specifying the HD control process 22 as a data input source.

The application board 111 separately compiles the PID control process 22 (PID control process 22), which is a process that is required to be immediately executed, and the process (the process of the MES 21), which is not required to be immediately executed (division compilation). Thereby, a program execution file for executing the HD control process 22 and a program execution file for executing the process of the MES 21 are generated.

Then, the application board 111 causes the spiral node 12 to execute the program execution file for executing a process (the PID control process 22) that is required to be immediately executed. On the other hand, the application board 111 causes the intelligence node 11 to execute the program execution file for executing a process (the process of the MES 21) that is not required to be immediately executed. Processes of both program execution files are executed in cooperation with each other based on information representing data input/output given to both application programs. As a result, the function of the desired application program is realized.

In the above-described embodiment, the application board 111 classifies a process included in the application program in accordance with whether or not it is requested to be immediately executed (for example, whether a control cycle preset to the device nodes 13-14 is equal to or less than the predetermined length) and performs the division compilation, but not limited thereto. For example, the application board 111 may classify a process included in the application program based on a process definition list in which whether it is requested to be immediately executed or not is defined preliminarily, and may perform the division compilation. This process definition list may be editable via an input means (not shown).

Alternatively, for example, the application board 111 may classify a process included in the application program in accordance with at least one of position information representing a position where the device constituting the device nodes 13-14 controlled by the application program is installed or the above-described process definition list, and may perform the division compilation.

For example, from a viewpoint of safety, based on position information of a device installed at a specific position, the application board 111 may cause the spinal node 12 to execute a program executable file for executing a process (the PID control process 22) that is required to be immediately executed, and may cause the intelligence node 11 to execute a program executable file for executing a process (the process of the MES 21) that is not required to be immediately executed.

There is a case that specific device nodes 13-14 are not desired to be operated by an application program other than a specific application program. For example, it is undesirable that PID control of device nodes 13-14 that inserts a control rod of a nuclear reactor is performed by an application program other than the application program dedicated to the device nodes 13-14 because of danger. In such a case, for example, the application board 111 may restrict the operation of the device nodes 13-14 so that the device nodes 13-14 operate only when the device nodes 13-14 receive a command from a specific application program or a specific account.

For example, when a process which uses the specific device nodes 13-14 is included in an application program other than the specific application program, the application board 111 causes it not to be compiled (makes a compile error) so that the program execution file is not generated. For example, when instructions for executing a compilation of an application program including a process which uses the specific device nodes 13-14 are received from an account other than the specific account, the application board 111 makes a compile error so that the program execution file is not generated.

(Operation of Co-Innovation Space)

Figure 15:
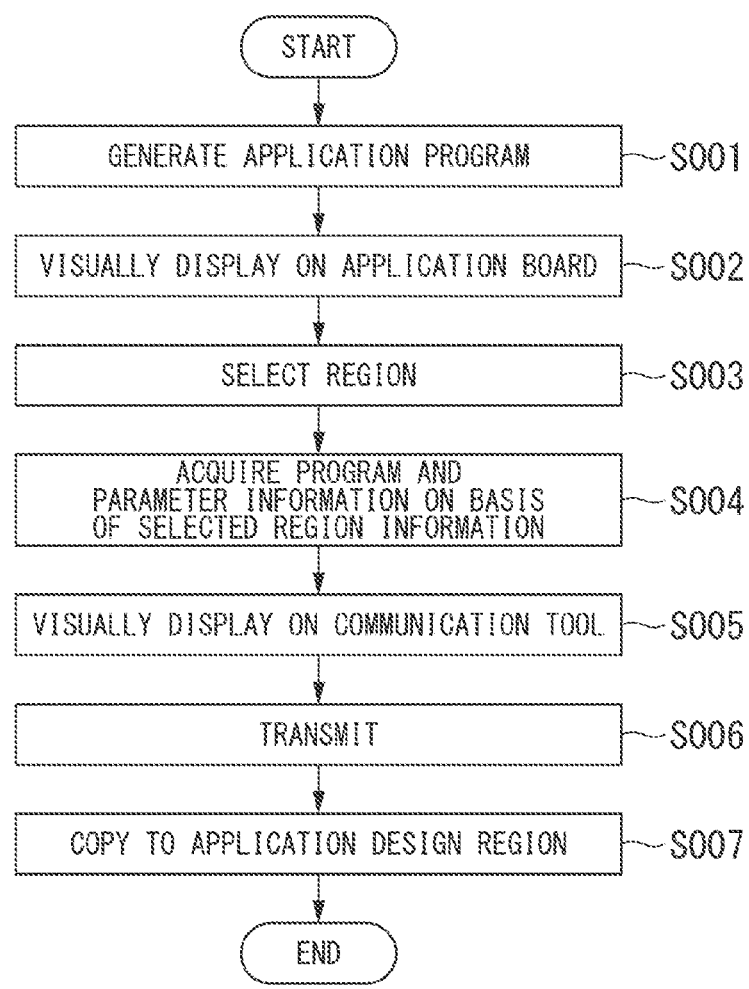
FIG. 15 is a flowchart showing an example of an operation of a co-innovation space implemented in the application development environment providing system according to the embodiment of the present invention.
Figure 16:
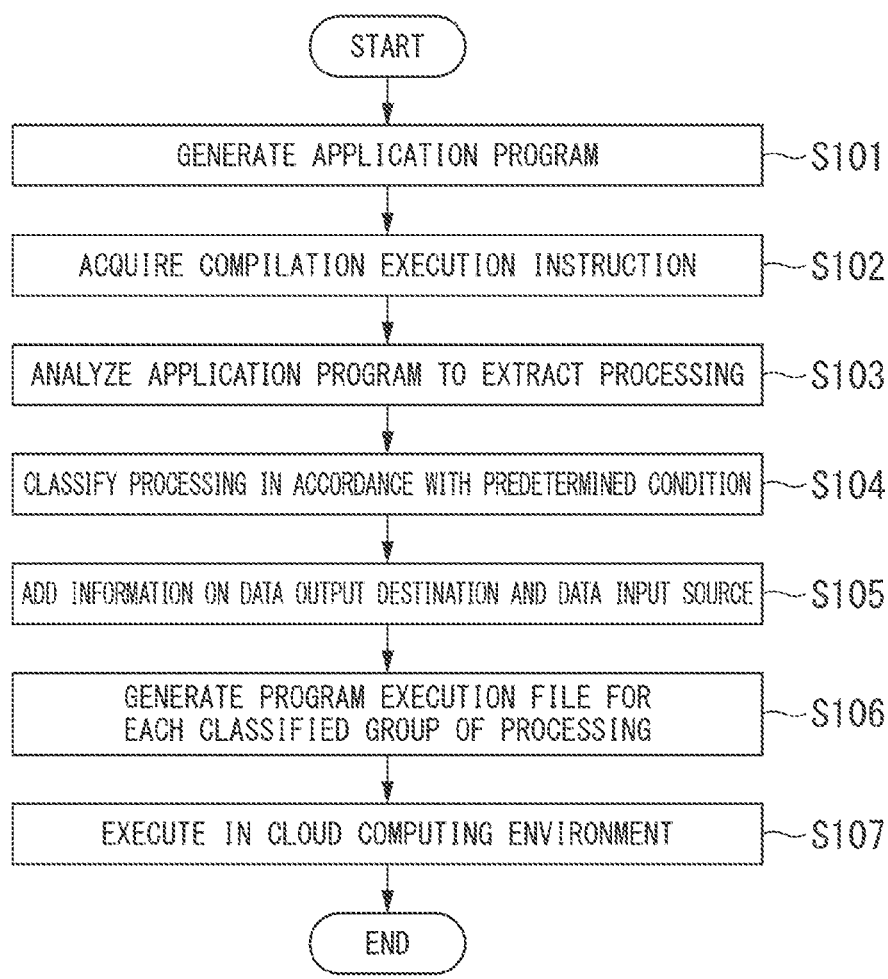
FIG. 16 is a flowchart showing an example of a division compilation performed by an application board of the application development environment providing system according to the embodiment of the present invention.

Hereinafter, an operation of the co-innovation space will be described. FIGS. 15 and 16 are flowcharts showing an example of the operation of the co-innovation space implemented in the application development environment providing system 1 according to the embodiment of the present invention.

FIG. 15 illustrates an operation of the co-innovation space when an application program is generated in the co-innovation space and a part of the generated application program is shared between accounts (users) by the communication tool.

(Step S001) The application board 111 displays a co-innovation space screen on the display. The application board 111 generates an application program according to an operation of the user. The application board 111 generates layout information, connection information, and the like regarding a structure of the generated application program. Thereafter, the process proceeds to step S002.

(Step S002) The application board 111 visually displays the application program generated in step S001 in the application design region of the co-innovation space screen. Thereafter, the process proceeds to step S003.

(Step S003) The application board 111 selects a region of a part of the application program visually displayed in step S002 according to an operation of the user, and generates the selected region information that is information indicating the selected region. Thereafter, the process proceeds to step S004.

(Step S004) The application board 111 acquires the application program and parameter information corresponding to the selected region on the basis of the selected region information generated in step S003. Thereafter, the process proceeds to step S005.

(Step S005) The communication tool 112 visually displays information indicating the part of the application program on the message region of the communication tool 112 on the basis of, for example, the application program, the parameter information, the layout information, the connection information, and the selected region information acquired by the application board 111 in steps S001 to S004 according to an operation of the user (for example, an operation of the user dragging and dropping the region indicating the part of the selected application program to the message display region of the chat screen). Thereafter, the process proceeds to step S006.

(Step S006) The communication tool 112 transmits information indicating the part of the application program to the communication tool of another user according to an operation of the user (for example, an operation for the user clicking on a transmission button on the chat screen) so that the information is visually displayed.

(Step S007) The user receiving the information indicating the part of the application program copies the visually displayed information, for example, the application program, the parameter information, the layout information, the connection information, and the selected region information acquired by the application board 111 in steps S001 to S004 to the application design region according to an operation of the user (for example, an operation of the user dragging and dropping the information visually displayed on the message display region of the chat screen to the application design region). The process of this flowchart ends.

FIG. 16 shows a series of operations in which the application board 111 generates an application program, performs a division compilation to generate a program execution file, and executes the application program in the cloud computing environment.

(Step S101) The application board 111 generates an application program in accordance with an operation by the user. Thereafter, the process proceeds to step S102.

(Step S102) The application board 111 acquires information representing instructions for executing a compilation which has been input in accordance with an operation by the user with respect to the application program generated in step S101. Thereafter, the process proceeds to step S103.

(Step S103) The application board 111 analyzes the application program generated in step S101 and extracts processes included in the application program. Thereafter, the process proceeds to step S104.

(Step S104) The application board 111 classifies the processes extracted in step S103 in accordance with a predetermined condition. For example, the application board 111 classifies each of the processes based on a length of the control cycle preset to the device nodes 13-14 controlled by each of the extracted processes. For example, if the control cycle is equal to or less than 1 second, the application board 111 classifies the extracted process into a process to be executed in the spinal node 12. On the other hand, if the control cycle is longer than 1 second, the application board 111 classifies the extracted process into a process to be executed in the intelligence node 11. Thereafter, the process proceeds to step S105.

(Step S105) In each of the processes included in each process group classified in step S104, in a case where a process involving data input/output with respect to a process included in a process group different from the process group including the process, the application board 111 gives, to the application program for executing the process, information representing a data output destination and a data input source in the data input/output.

For example, in a case where a process executed in the spinal node 12 includes a process of outputting data to a process executed in the intelligence node 11, the application board 111 gives, to the application program executed in the spinal node 12, identification information for identifying a process executed in the intelligence node 11 which is a data output destination. On the other hand, identification information for identifying a process executed in the spinal node 12 which is a data input source is given to the application program executed in the intelligence node 11. Thereafter, the process proceeds to step S106.

(Step S106) The application board 111 executes a compilation (division compilation) for each process group classified in step S104 to generate a program execution file for each classified process group. For example, the application board 111 generates a program execution file (first program execution file) executed in the spinal node 12 and a program execution file (second program execution file) executed in the intelligence node 11. Thereafter, the process proceeds to step S107.

(Step S107) The application board 111 causes the spiral node 12 to execute a program execution file executed in the spinal node 12. On the other hand, the application board 111 causes the intelligence node 11 to execute a program execution file executed in by intelligence node 11. Since the information representing the data output destination and the data input source is given to each application program in step S105, both of the program execution files are executed in cooperation with each other. As a result, the function of the desired application program is realized. This concludes the processing of this flowchart.

As described above, the application development environment providing system 1 according to the embodiment provides a development environment for application programs via a communication network. The application development environment providing system 1 can generate an application program on the basis of an input from a terminal connected to the development environment by the application board 111 (a program developer), and can visually display the generated application program. The application development environment providing system 1 can communicate among a plurality of users who use the development environment by the communication tool 112 (communicator), and can visually display the part or all of the application program generated by the application board 111 (a program developer) on a designated terminal.

As described above, in a case where it is necessary to take into consideration requirements such as a promptness, security, safety, etc. of an execution process in accordance with individual process contents included in the application program, the application development environment providing system 1 according to the present embodiment classifies the process contents based on the requirements, and generates an application program in which a program execution file is divided for each classified process contents. Then, a plurality of the divided program execution files are executed in different hierarchies in the cloud computing environment.

As a result, for example, even if it includes a process requiring promptness such as a process involving feedback such as PID control in an industrial automation and production system or the like, the application development environment providing system 1 according to the present embodiment causes the spinal node 12 to execute the process requiring promptness so as to reduce an influence of delay, fluctuation or the like in the data communication, and to generate an application program that is easy to normally perform a process such as control.

As described above, the application development environment providing system 1 according to the embodiment can realize efficient development of application programs in which a program execution file used in a cloud computing environment is divided into a plurality of files.

Although the embodiments of the present invention have been described in detail above, specific configurations are not limited to those described above, and various design changes and the like can be made without departing from the gist of the present invention.

A distributed process (load balancing) may be performed to a process in the first network by a plurality of devices in accordance with a load condition. Predetermined devices cooperate with each other in accordance with the load condition to perform the process in a sharing manner. The sharing ratio may be fixed or changed. In performing the distributed processing, there may be a case where a device accommodating a sensor or a device needs to be changed to a different device. In this case, the plurality of devices cooperate with each other to perform a handover process of the sensor or the device. That is, in a case where the first network accommodates at least two or more devices, the application board 111 may generate a first program execution file for performing a distributed process among the devices in accordance with the load condition of the devices.

A part or all of the application development environment providing system 1 in the embodiments described above may be realized by a computer. In this case, the part or all of the application development environment providing system 1 may be realized by recording one or more programs for realizing a control function thereof on a computer-readable recording medium, loading one or more programs recorded on the recording medium into a computer system, and executing the programs.

The "computer system" referred to herein is a computer system built in the application development environment providing system 1 and includes an OS or hardware such as peripheral devices. The "computer-readable recording medium" refers to a storage device, such as a portable medium such as a flexible disk, a magneto-optical disc, a ROM, or a CD-ROM, or a hard disk built in the computer system.

Further, the "computer-readable recording medium" may also include a recording medium that dynamically holds a program for a short period of time, such as a communication line when a program is transmitted via a network such as the Internet or a communication line such as a telephone line, or a recording medium that holds a program for a certain period of time, such as a volatile memory inside a computer system serving as a server or a client in such a case. Further, the program may be a program for realizing some of the above-described functions. Further, the program may be a program capable of realizing the above-described functions in combination with a program previously stored in the computer system.

The application development environment providing system 1 in the embodiment described above may be realized as an integrated circuit such as a large scale integration (LSI). Each functional block of the application development environment providing system 1 may be individually implemented as a processor, or a part or all thereof may be integrated into a processor. A scheme of the integration is not limited to the LSI, and the application development environment providing system 1 may be realized by a dedicated circuit or a general purpose processor. When an integrated circuit technology for replacing the LSI emerges due to the advance of a semiconductor technology, an integrated circuit according to the technology may be used.

The terms denoting directions such as "front, back, top, bottom, right, left, vertical, horizontal, bottom, horizontal, row, and column" in the present specification refer to these directions in the device of the present invention. Accordingly, these terms in the specification of the present invention should be construed relatively in the device of the present invention.

The term "configured" is configured to execute the functions of the present invention or is used to indicate a configuration, elements, and parts of a device.

Further, the terms expressed as "means-plus-function" in the claims should include any structure that can be used to execute the functions included in the present invention.

The term "unit" is used to indicate a component, unit, hardware, or a part of software programmed to execute a desired function. Typical examples of the hardware are devices or circuits, but the present invention is not limited thereto.

Although the preferred embodiments of the present invention have been described above, the present invention is not limited to these examples. Additions, omissions, substitutions, and other changes in the configuration are possible without departing from the spirit of the present invention. The present invention is not limited by the foregoing description, but only by the scope of the appended claims.

REFERENCE SIGNS LIST

1 Application development environment providing system
10 Socialization node
11 Intelligence node
12 Spinal node
13 Device node (sensor)
14 Device node
21 MES (manufacturing execution system)
22 HD control process
111 Application board (program developer)
112 Communication tool (communicator)
113 Library
114 Storage
115 Device manager
116 Tenant manager
117 Site and account manager
118 Application store
119 Charging unit
120 Database

The invention claimed is:

1. An application development environment providing system which provides an application development environment for an application program via a network in an industrial automation and production environment,
wherein the application development environment providing system is configured in a hierarchical structure of four layers comprising:
a device node;
a spinal node which accommodates at least one device, a first process being executed in the spinal node, the first process being required to control a first device at a first operational control cycle which is equal to or less than a predetermined reference time;
an intelligence node; and
a socialization node communicatively connected to the spinal node, a second process being executed in the socialization node, the second process being not required to control a second device at a second operational control cycle which is equal to or less than the predetermined reference time,
wherein the device node includes at least one of a device that operates in real time, a device that is used for an application in which data delay or fluctuation is not permitted, and a device in which a communication band is tightened when the device is directly connected to the intelligence node,
wherein the spinal node functions as a gateway,
wherein the intelligence node provides a function for enabling at least one of the application development environment and an application execution environment to be shared among organizations or among a plurality of employees,
wherein the socialization node provides a function of enabling at least one of the application development environment and the application execution environment to be shared beyond boundaries of enterprises and organizations that jointly develop applications, between an enterprise providing applications and enterprise customers that use applications, and between an enterprise and an individual, and wherein the application development environment providing system comprises a hardware processor which implements:

a program developer configured to classify processes included in the application program into the first process executed in the spinal node and the second process executed in the socialization node based on whether the processes are required to be executed at the first operational control cycle which is equal to or less than the predetermined reference time, and to generate a first program execution file executed in the spinal node and a second program execution file executed in the socialization node in cooperation with the first program execution file.

2. The application development environment providing system according to claim 1, wherein if the first operational control cycle of the device controlled by the application program is equal to or less than a length of the predetermined reference time, the program developer classifies the process into the first process, and wherein if the control cycle of the device controlled by the application program is longer than the length of the predetermined reference time, the program developer classifies the process into the second process.

3. The application development environment providing system according to claim 1, wherein the program developer classifies the processes into the first process and the second process based on position information representing a position of the device controlled by the application program.

4. The application development environment providing system according to claim 1, wherein the program developer classifies the processes into the first process and the second process based on information representing that each of the processes is to be executed in the first network or the second network.

5. The application development environment providing system according to claim 1, wherein if it is determined that it is necessary to execute the process with reference to communication contents transmitted from the device controlled by the application program to the first network, the program developer classifies the process into the first process, and wherein if it is determined that it is not necessary to execute the process with reference to communication contents transmitted from the device to the first network, the program developer classifies the process into the second process.

6. The application development environment providing system according to claim 1, wherein the program developer generates the first program execution file in which first output destination process identification information and first input source process identification information are specified, the first output destination process identification information is for identifying a data input process executed in the second network to which data output by a data output process executed in the first network is input, and the first input source process identification information is for identifying a data output process executed in the second network to which data input by a data input process executed in the first network is output, and wherein the program developer generates the second program execution file in which second output destination process identification information and second input source process identification information are specified, the second output destination process identification information is for identifying a data input process executed in the first network to which data output by a data output process executed in the second network is input, and the second input source process identification information is for identifying a data output process executed in the first network to which data input by a data input process executed in the second network is output.

7. The application development environment providing system according to claim 1, wherein if the first network accommodates at least two or more devices, the program developer generates the first program execution file for causing the at least two or more devices to perform a distributed process in accordance with a load condition of the at least two or more devices.

8. The application development environment providing system according to claim 1, wherein the first network is a spinal node which functions as a gateway, and wherein the second network is a socialization node which provides a cloud computing environment.

9. The application development environment providing system according to claim 1, wherein the first operational control cycle and the second operational control cycle are preset.

10. An application development environment provision method performed by a computer which provides an application development environment for an application program via a network in an industrial automation and production environment, wherein the application development environment providing system is configured in a hierarchical structure of four layer comprising:

a device node;

a spinal node that accommodates at least one device, a first process being executed in the spinal node, the first process being required to control a first device at a first operational control cycle which is equal to or less than a predetermined reference time;

an intelligence node;

and a socialization node communicatively connected to the spinal node, a second process being executed in the socialization node, the second process being not required to control a second device at a second operational control cycle which is equal to or less than the predetermined reference time, wherein the device node includes at least one of a device that operates in real time, a device that is used for an application in which data delay or fluctuation is not permitted, and a device in which a communication band is tightened when the device is directly connected to the intelligence node, wherein the spinal node functions as a gateway, wherein the intelligence node provides a function for enabling at least one of the application development environment and an application execution environment to be shared among organizations or among a plurality of employees, wherein the socialization node provides a function of enabling at least one of the application development environment and the application execution environment to be shared beyond boundaries of enterprises and organizations that jointly develop applications, between an enterprise providing applications and enterprise customers that use applications, and between an enterprise and an individual, and wherein the application development environment provision method comprises:

classifying, by a program developer, processes included in the application program into the first process executed in the spinal node and the second process executed in the socialization node based on whether the processes are required to be executed at the first operational control cycle which is equal to or less than the predetermined reference time; and generating, by the program developer, a first program execution file executed in the spinal node and a second program execution file executed in the socialization node in cooperation with the first program execution file.

11. The application development environment provision method according to claim 10, wherein the first operational control cycle and the second operational control cycle are preset.

12. An information processing device in an application development environment providing system which provides an application development environment for an application program via a network in an industrial automation and production environment, wherein the application development environment providing system is configured in a hierarchical structure of four layers comprising:

a device node;

a spinal node that accommodates at least one device, a first process being executed in the spinal node, the first process being required to control the device at a first operational control cycle which is equal to or less than a predetermined reference time; and a socialization node communicatively connected to the spinal node, a second process being executed in the socialization network, the second process being not required to control the device at second operational control cycle which is equal to or less than the predetermined reference time, wherein the device node includes at least one of a device that operates in real time, a device that is used for an application in which data delay or fluctuation is not permitted, and a device in which a communication band is tightened when the device is directly connected to the intelligence node, wherein the spinal node functions as a gateway, wherein the intelligence node provides a function for enabling at least one of the application development environment and an application execution environment to be shared among organizations or among a plurality of employees, wherein the socialization node provides a function of enabling at least one of the application development environment and the application execution environment to be shared beyond boundaries of enterprises and organizations that jointly develop applications, between an enterprise providing applications and enterprise customers that use applications, and between an enterprise and an individual, and wherein the information processing device comprises a hardware processor which is configured to, among processes included in the application program classified into the first process executed in the spinal node and the second process executed in the socialization node based on whether the processes are required to be executed at the first operational control cycle which is equal to or less than the predetermined reference time, execute a first program execution file for executing the first process in cooperation with a second program execution file for executing the second process.

13. The information processing device according to claim 12, wherein if the first operational control cycle of the device controlled by the application program is equal to or less than a length of the predetermined reference time, the information processing device executes the first program execution file which has been classified into the first process and generated.

14. The information processing device according to claim 12, wherein the information processing device executes the first program execution file which has been classified into the first process and generated, based on position information representing a position of the device controlled by the application program.

15. The information processing device according to claim 12, wherein the information processing device executes the first program execution file which has been classified into the first process and generated, based on information representing that each of the processes is to be executed in the first network or the second network.

16. The information processing device according to claim 12, wherein if it is determined that it is necessary to execute the process with reference to communication contents transmitted from the device controlled by the application program to the first network, the process is classified into the first process, wherein if it is determined that it is not necessary to execute the process with reference to communication contents transmitted from the device to the first network, the process is classified into the second process, and wherein the information processing device executes the first program execution file which has been classified into the first process and generated.

17. The information processing device according to claim 12, wherein the information processing device executes the first program execution file in which output destination process identification information and input source process identification information are specified, the output destination process identification information is for identifying a data input process executed in the second network to which data output by a data output process executed in the first network is input, and the input source process identification information is for identifying a data output process executed in the second network to which data input by a data input process executed in the first network is output.

18. The information processing device according to claim 12, wherein if the first network accommodates at least two or more devices, the information processing device executes the first program execution file for causing the at least two or more devices to perform a distributed process in accordance with a load condition of the at least two or more devices.

19. The information processing device according to claim 12,
wherein the first network is a spinal node which functions as a gateway, and
wherein the second network is a socialization node which provides a cloud computing environment.

20. The information processing device according to claim 12, wherein the first operational control cycle and the second operational control cycle are preset.

21. An application development environment provision method performed by a computer which provides an application development environment for an application program via a network in an industrial automation and production environment,
wherein the application development environment proving system is configured in a hierarchical structure of four layers comprising:
a device node;
a spinal node that accommodates at least one device, a first process being executed in the spinal node, the first process being required to control the device at a first operational control cycle which is equal to or less than a predetermined reference time;
an intelligence node; and
a socialization node communicatively connected to the spinal node, a second process being executed in the socialization node, the second process being not required to control the device at a second operational control cycle which is equal to or less than the predetermined reference time,
wherein the device node includes at least one of a device that operates in real time, a device that is used for an application in which data delay or fluctuation is not permitted, and a device in which a communication band is tightened when the device is directly connected to the intelligence node,
wherein the spinal node functions as a gateway,
wherein the intelligence node provides a function for enabling at least one of the application development environment and an application execution environment to be shared among organizations or among a plurality of employees,
wherein the socialization node provides a function of enabling at least one of the application development environment and the application execution environment to be shared beyond boundaries of enterprises and organizations that jointly develop applications, between an enterprise providing applications and enterprise customers that use applications, and between an enterprise and an individual, and
wherein the application development environment provision method comprises:
among processes included in the application program classified into the first process executed in the spinal node and the second process executed in the socialization node based on whether the processes are required to be executed at the first operational control cycle which is equal to or less than the predetermined reference time, executing a first program execution file for executing the first process in cooperation with a second program execution file for executing the second process.

22. The application development environment provision method according to claim 21, wherein the first operational control cycle and the second operational control cycle are preset.

* * * * *